US007002751B2

(12) United States Patent
Kobayashi et al.

(10) Patent No.: US 7,002,751 B2
(45) Date of Patent: Feb. 21, 2006

(54) IMAGE DISPLAY APPARATUS

(75) Inventors: Yasushi Kobayashi, Itami (JP); Soh Ohzawa, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 1009 days.

(21) Appl. No.: 09/963,308

(22) Filed: Sep. 26, 2001

(65) Prior Publication Data
US 2002/0057498 A1 May 16, 2002

(30) Foreign Application Priority Data
Sep. 27, 2000 (JP) ............................. 2000-293975

(51) Int. Cl.
*G02B 27/14* (2006.01)
(52) U.S. Cl. ...................... 359/631; 359/630; 359/633
(58) Field of Classification Search ........ 359/629–631, 359/633, 636, 638; 345/7–9
See application file for complete search history.

(56) References Cited

U.S. PATENT DOCUMENTS

| 6,023,253 | A | | 2/2000 | Taniguchi et al. .............. 345/7 |
| 6,313,950 | B1 | * | 11/2001 | Hayakawa et al. .......... 359/630 |
| 6,333,820 | B1 | * | 12/2001 | Hayakawa et al. .......... 359/633 |
| 6,342,871 | B1 | * | 1/2002 | Takeyama ...................... 345/7 |
| 6,417,970 | B1 | * | 7/2002 | Travers et al. ............... 359/630 |
| 6,445,507 | B1 | * | 9/2002 | Togino et al. ............... 359/637 |
| 6,493,146 | B1 | * | 12/2002 | Inoguchi et al. ............. 359/630 |
| 6,512,635 | B1 | * | 1/2003 | Takeyama ...................... 359/638 |
| 6,552,854 | B1 | * | 4/2003 | Kuramochi et al. ........ 359/627 |
| 6,655,820 | B1 | * | 12/2003 | Jung et al. ................... 362/318 |
| 6,814,442 | B1 | * | 11/2004 | Okuyama et al. ............. 353/20 |
| 2001/0022689 | A1 | * | 9/2001 | Takeyama ...................... 359/625 |
| 2002/0060851 | A1 | * | 5/2002 | Yamazaki ...................... 359/630 |

FOREIGN PATENT DOCUMENTS

| JP | 08-320451 A | 12/1996 |
| JP | 2000-081591 A | 3/2000 |
| JP | 2000-147422 A | 5/2000 |

* cited by examiner

*Primary Examiner*—Ricky Mack
(74) *Attorney, Agent, or Firm*—Sidley Austin Brown & Wood LLP

(57) ABSTRACT

An image display apparatus forms illumination light from a light source into image light by using a reflective display device, and directs the image light through an eyepiece optical system to an eye to present a virtual image of the image carried by the image light. To realize an image display apparatus of this type that is compact, affords a sufficiently long eye relief, and offers wide-field, high-quality images, a combiner for making the optical path of the illumination light from the light source overlap with that of the image light is disposed inside the eyepiece optical system, a positive lens is provided in the rear potion of the eyepiece optical system between the display device and the combiner, a concave reflective surface is provided in the front portion of the eyepiece optical system between the combiner and the observation point, and the eyepiece optical system is designed to be overtelecentric as a whole.

12 Claims, 17 Drawing Sheets

IMAGE DISPLAY APPARATUS

This application is based on Japanese Patent Application No. 2000-293975 filed on Sep. 27, 2000, the contents of which are hereby incorporated by reference.

BACKGROUND OF THE INVENTION

1. Field of the Invention

The present invention relates to an image display apparatus that is used in front of an eye, such as those used as viewfinders in various cameras and as head-mounted displays.

2. Description of the Prior Art

Many video cameras and digital cameras are equipped with an image display apparatus as a viewfinder. On the other hand, image display apparatus of the type called head-mounted displays (HMDs) have been becoming increasingly popular in recent years. These image display apparatus are used in front of an eye, and are typically composed of a display device for displaying an image, a light source for feeding illumination light to the display device, and an eyepiece optical system for directing image light (the light carrying the image) from the display device to the eye so as to present a virtual image of the image displayed on the display device.

Among many types of display devices, reflective liquid crystal panels are in wide use because they are compact but nevertheless offer high resolution and in addition high light use efficiency. However, a reflective liquid crystal panel needs to be illuminated from in front of its display surface, and therefore, unless a complicated arrangement is adopted in which the path of image light deviates greatly from that of illumination light, it is inevitable to dispose in front of the panel a combiner for combining the paths of image and illumination light.

Moreover, a reflective liquid crystal panel reflects illumination light substantially regularly, and therefore, to make the panel uniformly bright with respect to the observer's eye, it is necessary to dispose on the path of illumination light a condenser lens so that the light source, or the secondary light source such as a diffuser panel that is illuminated by the light source, is substantially conjugate with the observation point at which the observer's eye is located.

U.S. Pat. No. 6,023,253 discloses an arrangement in which, between a reflective liquid crystal panel and an eyepiece lens, a polarization separation (PBS) block is disposed as a combiner and, between the combiner and a light source, a condenser lens is disposed. However, in this arrangement, the beam diameter of the illumination light incident on the PBS block is so large that it is impossible to make the block satisfactorily slim. Moreover, the condenser lens is located to the side of the eyepiece optical system, and this makes the apparatus as a whole unduly large.

Japanese Patent Applications Laid-Open Nos. 2000-81519 and 2000-147422 disclose arrangements that permit the omission of the condenser lens between the combiner and the light source. FIG. 18 schematically shows those arrangements. In FIG. 18, reference numeral 51 represents a reflective liquid crystal panel, reference numeral 52 represents an eyepiece optical system, reference numeral 53 represents a light source, and reference numeral 54 represents a combiner. The eyepiece optical system 52 includes positive lenses 52a and 52b, and the combiner 54 is disposed between these two positive lenses 52a and 52b. That is, the positive lens 52b is located between the panel 51 and the combiner 54, and this positive lens 52b functions as a condenser lens as well. This makes it possible to place the light source 53 nearer to the combiner 54 to some degree and thereby make the apparatus as a whole more compact.

However, in the arrangements disclosed in Japanese Patent Applications Laid-Open Nos. 2000-81519 and 2000-147422 mentioned above, the eyepiece optical system has a positive refractive optical element in its portion located on the observation point side of the combiner, and this positive refractive optical element, together with the panel-side positive lens, contributes to a large Petzval sum. As is well known, a large Petzval sum causes large, negative curvature of field. This makes it impossible to present the observer with a high-quality image (virtual image).

Moreover, in the arrangements disclosed in the aforementioned laid-open applications, the observation point is made conjugate with the light source by designing the eyepiece optical system to be substantially telecentric with respect to the liquid crystal panel and by making the illumination light substantially parallel with respect to the liquid crystal panel. Thus, the observation point is located at the front focal point of the eyepiece optical system as a whole, and the light source is located at a point equivalent to the front focal point of that portion of the eyepiece optical system which is located between the combiner and the panel.

As a result, it is extremely difficult to shorten the focal length of the eyepiece optical system and thereby widen the field of view of the image presented while securing a sufficiently long eye relief (the distance from the front end of the eyepiece optical system to the observation point). Moreover, attempting to make the apparatus as a whole still more compact by placing the light source nearer to the combiner leads to an increase in the power of the positive lens disposed between the panel and the combiner and thus to a further increase in the Petzval sum. This makes further miniaturization also difficult.

SUMMARY OF THE INVENTION

An object of the present invention is to provide an image display apparatus that is compact, affords a sufficiently long eye relief, and offers wide-field, high-quality images.

To achieve the above object according to one aspect of the present invention, an image display apparatus is provided with: a display device of a reflective type for displaying an image and reflecting illumination light fed thereto from ahead so as to produce image light representing the image; an eyepiece optical system, disposed in front of the display device and composed of a rear portion nearer to the display device and a front portion farther from the display device, for directing the image light from the display device through the rear and front portions to a predetermined observation point so as to permit a virtual image of the image displayed by the display device to be observed at the observation point; a light source, disposed in a position substantially conjugate with the observation point, for emitting the illumination light fed to the display device; and a combiner, disposed between the rear and front portions of the eyepiece optical system, for introducing the illumination light from the light source into the rear portion of the eyepiece optical system in such a way that the path of the illumination light overlaps with the path of the image light. Here, the rear portion of the eyepiece optical system includes a refractive optical element having a positive power, the front portion of the eyepiece optical system includes a concave reflective surface, and the eyepiece optical system has an exit pupil behind and at a finite distance from the display device.

In this image display apparatus, the rear portion of the eyepiece optical system includes a refractive optical element having a positive power, and this eliminates the need to dispose a condenser lens between the combiner and the light source. Moreover, the front portion of the eyepiece optical system includes a concave reflective surface, and this helps reduce the Petzval sum of the eyepiece optical system as a whole and thereby suppress curvature of field. In addition, the exit pupil of the eyepiece optical system is located behind and at a finite distance from the display device, i.e. the eyepiece optical system is designed to be overtelecentric, and this makes it possible to secure a sufficiently long eye relief while making the field of view of the presented image satisfactorily wide. Furthermore, the position substantially conjugate with the observation point is nearer to the combiner than is the position equivalent to the front focal point of the rear portion of the eyepiece optical system, and this permits the light source to be disposed near the combiner.

In this image display apparatus, it is advisable that the following relations be fulfilled:

$$1 < fa/ft \leq 1.4 \quad (1)$$

$$0.3 \leq Epd/fb \leq 0.9 \quad (2)$$

where
- ft represents the focal length of the eyepiece optical system as a whole;
- fa represents the focal length of the front portion of the eyepiece optical system;
- fb represents the focal length of the rear portion of the eyepiece optical system; and
- Epd represents the distance from the rear end of the eyepiece optical system to the exit pupil of the eyepiece optical system.

The greater the value of fa/ft, i.e. the ratio of the focal length of the front portion of the eyepiece optical system to that of the eyepiece optical system as a whole, the stronger the positive power of the rear portion needs to be. However, making the positive power of the rear portion too strong causes large aberrations, such as coma aberration, that degrade off-axial performance, and also causes large chromatic aberration. Within the range defined by expression (1) above, such aberrations are satisfactorily suppressed.

The greater the value of Epd/fb, i.e. the ratio of the distance from the eyepiece optical system to the exit pupil to the focal length of the rear portion of the eyepiece optical system, the longer the distance from the combiner to the light source located in a position conjugate with the observation point. Within the range defined by expression (2) above, it is easy to avoid the interference of the light source with the eyepiece optical system while placing the light source near the combiner.

In the image display apparatus described above, it is advisable that the concave reflective surface included in the front portion of the eyepiece optical system be a semitransparent reflective surface that partially reflects and partially transmits light, and be so disposed as to point to the observation point, and that the front portion of the eyepiece optical system include a selective reflective surface that is so disposed as to face the concave reflective surface and that reflects or transmits light selectively according to the polarization direction of the light. In this arrangement, the image light reciprocates between the semitransparent reflective surface, acting as the concave reflective surface, and the selective reflective surface. This makes it possible to widen the field of view of the presented image while making the front portion of the eyepiece optical system smaller.

Here, it is advisable that the concave reflective surface included in the front portion of the eyepiece optical system be formed as a concave surface of a meniscus lens, and that the selective reflective surface included in the front portion of the eyepiece optical system be formed on the flat surface of a member that has a flat surface and that transmits light. This helps make the construction of the front portion very simple.

It is advisable that the convex surface of the meniscus lens included in the front portion of the eyepiece optical system be formed as an aspherical surface. Forming a refractive surface as an aspherical surface makes it easy to prevent degradation of off-axial performance.

It is advisable that the meniscus lens included in the front portion of the eyepiece optical system be composed of a concave surface side portion made of glass and a convex surface side portion made of resin. Since the selective reflective surface reflects light by exploiting the difference in the polarization direction, if the concave surface side portion of the meniscus lens that directs light to the selective reflective surface is made of resin, which exhibits a high degree of birefringence, ghosts are likely to result. This inconvenience can be avoided by forming the concave surface side portion of the meniscus lens out of glass, and forming the convex surface side portion thereof out of resin makes it easy to form the convex surface as an aspherical surface.

It is advisable that the refractive optical element having a positive power included in the rear portion of the eyepiece optical system be a planoconvex lens. This helps make the construction of the rear portion very simple.

It is advisable that the refractive optical element having a positive power included in the rear portion of the eyepiece optical system have an aspherical convex surface. Forming a refractive surface as an aspherical surface makes it easy to suppress curvature of field.

It is advisable that the display device be a reflective liquid crystal panel, and that the combiner be a reflective polarizing plate. Using a reflective liquid crystal panel makes it possible to benefit from the advantages described earlier that it offers, and using a reflective polarizing plate instead of a semitransparent mirror as the combiner makes it possible to use light efficiently for image presentation. In this case, the illumination light from the light source is formed into linearly polarized light that suits the reflective polarizing plate, and the liquid crystal panel is so controlled that the image light has its polarization plane rotated by 90°.

It is advisable that the optical axis of the rear portion of the eyepiece optical system coincide with the optical axis of the front portion thereof, that the combiner be planar, and that the angle between the optical axis of the eyepiece optical system and a normal to the combiner be in the range from 30° to 40°.

When the angle θ between the optical axis of the eyepiece optical system and a normal to the combiner equals 45°, the combiner occupies equal dimensions in the directions perpendicular and parallel to the optical axis of the eyepiece optical system. The smaller the angle θ, the nearer the light source is located to the rear portion of the eyepiece optical system. This makes it necessary to increase the distance from the light source to the combiner to avoid the interference between the light source and the rear portion of the eyepiece optical system. By setting the angle θ within the aforementioned range, it is possible to reduce the dimension that the combiner occupies in the direction parallel to the optical axis of the eyepiece optical system, and thus to place the rear and front portions of the eyepiece optical system nearer to each other. In addition, it is then easy to place the light source near the combiner while avoiding the interference between the light source and the rear portion of the eyepiece optical system. Furthermore, in a case where a reflective polarizing plate is used as the combiner, it is possible to benefit from the characteristic of the reflective polarizing plate that exhibits increasingly high transmittances as the angle of incidence decreases, and thereby suppress the loss of the image light.

It is advisable that the rear and front portions of the eyepiece optical system each include a prism, and that the combiner be disposed between the prism included in the rear portion of the eyepiece optical system and the prism included in the front portion thereof. This makes it possible to shorten the optical length, as converted into the equivalent length in air, according to the thicknesses and refractive indices of the prisms, and thereby shorten the focal length of the eyepiece optical system, i.e. widen the field of view of the presented image.

Here, it is advisable that the prism included in the rear portion of the eyepiece optical system have a convex surface so as to be shared as the refractive optical element having a positive power. This eliminates the need to provide a refractive optical element separately, and thus helps make the construction of the rear portion of the eyepiece optical system very simple.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
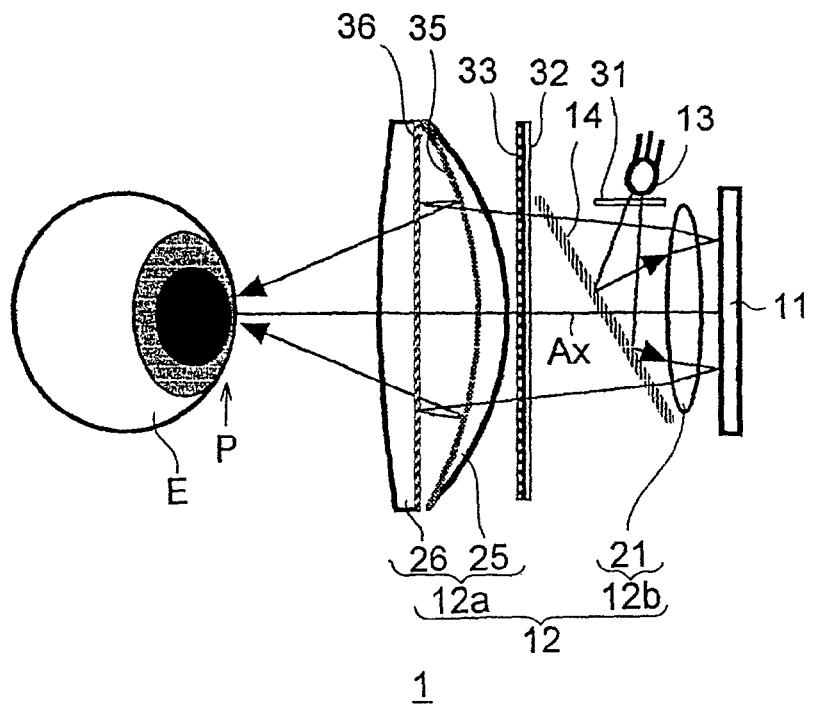
FIG. 1 is a diagram schematically showing the overall construction of the image display apparatus of a first embodiment of the invention.

Hereinafter, image display apparatus embodying the present invention will be described with reference to the drawings. FIG. 1 schematically shows the overall construction of the image display apparatus 1 of a first embodiment of the invention. The image display apparatus 1 is provided with a reflective liquid crystal panel 11, an eyepiece optical system 12, a light source 13, and a combiner 14.

The liquid crystal panel 11 displays an image, modulates illumination light fed from ahead with the displayed image to produce image light representing the image, and emits the image light ahead. The liquid crystal panel 11 is driven by a driver circuit (not shown) according to an image signal.

The eyepiece optical system 12 is disposed in front of the liquid crystal panel 11 with the optical axis Ax of the former perpendicular to the latter. The eyepiece optical system 12 directs the image light from the liquid crystal panel 11 to a predetermined observation point P. The observer, by viewing the liquid crystal panel 11 through the eyepiece optical system 12 with his or her eye E positioned at the observation point P, can observe an enlarged virtual image of the image displayed by the liquid crystal panel 11. The pupil of the observer corresponds to the aperture stop of the eyepiece optical system 12, and the observation point P is located at the aperture stop of the eyepiece optical system 12.

The eyepiece optical system 12 is composed of two portions, namely a rear portion 12b nearer to the liquid crystal panel 11 and a front portion 12a farther from the liquid crystal panel 11, and the optical axes of the rear and front portions 12b and 12a coincide with each other. The rear portion 12b of the eyepiece optical system 12 is composed of a positive lens 21, and the front portion 12a thereof is composed of a meniscus lens 25 and a planoconvex lens 26. In the front portion 12a, the meniscus lens 25 is disposed with its concave surface pointing to the observation point P, and the planoconvex lens 26 is disposed on the observation point P side of the meniscus lens 25 with the flat surface of the former pointing to the latter.

The combiner 14 is disposed between the rear and front portions 12b and 12a of the eyepiece optical system 12 so as to obliquely cross the optical axis Ax of the eyepiece optical system 12. In the image display apparatus 1, a flat-surfaced half mirror is used as the combiner 14. The angle θ between a normal to the combiner 14 and the optical axis Ax of the eyepiece optical system 12 is in the range form 30° to 40°.

The light source 13 emits illumination light that is fed to the liquid crystal panel 11. The illumination light emitted by the light source 13 is unpolarized light. The light source 13 is disposed in a position conjugate with the observation point P with respect to the eyepiece optical system 12.

The image display apparatus 1 is provided with, in addition to the components mentioned already, a polarizing plate 31, a polarizing plate 32, and a quarter-wave plate 33.

The polarizing plate 31 is disposed in the vicinity of the light source 13. The polarizing plate 32 and the quarter-wave plate 33 are disposed between the half mirror 14 and the front portion 12a of the eyepiece optical system 12, with the polarizing plate 32 placed nearer to the liquid crystal panel 11.

On the concave surface of the meniscus lens 25 is provided a semitransparent reflective film 35, and on the flat surface of the planoconvex lens 26 is provided a cholesteric liquid crystal layer 36. The semitransparent reflective film 35, like a common half mirror, partially reflects light and partially transmits light. The cholesteric liquid crystal layer 36 reflects one and transmits the other of two types of circularly polarized light that are polarized in opposite rotation directions.

The illumination light emitted by the light source 13 is formed into linearly polarized light by the polarizing plate 31, and then strikes the half mirror 14, by which a half of the illumination light is reflected. The illumination light reflected from the combiner 14 passes through the positive lens 21 constituting the rear portion 12b of the eyepiece optical system 12, and then strikes the display surface of the liquid crystal panel 11. Here, the positive lens 21 functions as a condenser lens so that the illumination light illuminates the entire display surface of the liquid crystal panel 11 uniformly.

The liquid crystal panel 11 modulates the illumination light, which is now linearly polarized, by rotating the polarization plane of part of the illumination light by 90°. The liquid crystal panel 11 is controlled either in such a way that the part of the linearly polarized light of which the polarization plane has been rotated by modulation is used as image light representing an image or in such a way that the part of the linearly polarized light of which the polarization plane has not been rotated by modulation is used as image light representing an image.

The image light from the liquid crystal panel 11 travels along the same optical path as the illumination light in the opposite direction, then passes through the positive lens 21 again, and then strikes the half mirror 14, by which a half of the image light is transmitted. The image light transmitted through the half mirror 14 then strikes the polarizing plate 32. The polarizing plate 32 is so configured, according to how the liquid crystal panel 11 is controlled, as to transmit light that is linearly polarized in the way that the image light is. Thus, the part of the light coming from the liquid crystal panel 11 of which the polarization plane is perpendicular to that of the image light is eliminated by the polarizing plate 32.

The image light transmitted through the polarizing plate 32 then passes through the quarter-wave plate 33 and is thereby formed into right-hand or left-hand circularly polarized light. This image light then enters the meniscus lens 25 through its convex surface, and a half of the image light is transmitted through the semitransparent reflective film 35 provided on the concave surface of the meniscus lens 25. The image light transmitted through the semitransparent reflective film 35 then strikes the cholesteric liquid crystal layer 36. The cholesteric liquid crystal layer 36 has its chirality so set as to reflect light that is circularly polarized in that rotation direction in which the light that has been transmitted through the quarter-wave plate 33 is, and thus reflects the image light that strikes it. The image light reflected from the cholesteric liquid crystal layer 36, while keeping its rotation direction, strikes the semitransparent reflective film 35, by which a half of the image light is reflected.

The image light, by being reflected by the semitransparent reflective film 35, is formed into light circularly polarized in the opposite rotation direction, and then strikes the cholesteric liquid crystal layer 36 again, by which the image light is transmitted this time. The image light transmitted through the cholesteric liquid crystal layer 36 then passes through the planoconvex lens 26, and then reaches the observation point P.

While traveling along the optical path described above, the image light from the liquid crystal panel 11 is subjected to the positive powers resulting from the refraction at the positive lens 21, the convex surface of the meniscus lens 25, and the convex surface of the planoconvex lens 26 and from the reflection at the concave surface of the meniscus lens 25. As a result, an enlarged virtual image of the image displayed on the liquid crystal panel 11 is presented to the eye E positioned at the observation point P. By adding a concave reflective surface to the front portion 12a of the eyepiece optical system 12 so that it is not composed solely of refractive optical elements, it is possible to avoid increasing the Petzval sum of the eyepiece optical system 12 as a whole and thereby obtain images with almost no curvature of field.

The eyepiece optical system 12 is so configured as to have its exit pupil (the pupil with respect to the observation point P located at the aperture stop) behind the liquid crystal panel 11 (on the opposite side of the liquid crystal panel 11 to the eyepiece optical system 12). That is, the eyepiece optical system 12 is designed to be overtelecentric.

Let the focal length of the eyepiece optical system 12 as a whole, i.e. its rear and front portions 12b and 12a together, be ft, and let the focal length of the front portion 12a of the eyepiece optical system 12 be fa. Then, these are so determined as to fulfill the relation given by expression (1) below (the same as the identically numbered one presented earlier).

$$1 < fa/ft \leq 1.4 \qquad (1)$$

Setting an upper limit to the ratio fa/ft of the focal length of the front portion 12a to the focal length of the eyepiece optical system 12 as a whole in this way eliminates the need to give the rear portion 12b a very strong power and thereby helps suppress aberrations occurring in the rear portion 12b composed of the positive lens 21, which is a refractive optical element. Within the range defined by expression (1), almost no coma or chromatic aberration, which degrades off-axial performance, occurs.

Moreover, let the focal length of the rear portion 12b of the eyepiece optical system 12 be fb, and let the distance from the rear end of the eyepiece optical system 12 (i.e. the liquid crystal panel 11 side surface of the positive lens 21) to the exit pupil of the eyepiece optical system 12 be Epd. Then, these are so determined as to fulfill the relation given by expression (2) below (the same as the identically numbered one presented earlier).

$$0.3 \leq Epd/fb \leq 0.9 \qquad (2)$$

The greater the ratio Epd/fb of the distance from the eyepiece optical system 12 to the exit pupil to the focal length of the rear portion 12b of the eyepiece optical system 12, the longer the distance from the half mirror 14, i.e. the combiner, to the light source 13 located in a position conjugate with the observation point P, and thus the larger the beam diameter of the light that strikes the half mirror 14. This requires the half mirror 14 itself to be made larger. Setting an upper limit to the ratio Epd/fb as defined by expression (2) makes it possible to place the light source 13 near the half mirror 14, and thus helps avoid making the image display apparatus as a whole larger. Moreover, setting a lower limit to the ratio Epd/fb as defined by expression (2) helps avoid a situation in which the light source 13 is so near the half mirror 14 that it is difficult to place the eyepiece optical system 12 in such a way that it does not interfere with the rear portion 12b of the eyepiece optical system 12.

The smaller the half mirror 14, which is disposed so as to obliquely cross the optical axis Ax of the eyepiece optical system 12, the nearer the front and rear portions 12a and 12b can be placed to each other. This is desirable for the miniaturization of the image display apparatus as a whole. In addition, as described earlier, the inclination of the half mirror 14 relative to the optical axis Ax is in the range from 30° to 40°, i.e. not 45°, and therefore the dimension of the space required to dispose the half mirror 14 as measured in the direction along the optical axis Ax is smaller than the dimension of the same space as measured in the direction perpendicular to the optical axis Ax. This makes it easier to place the front and rear portions 12a and 12b nearer to each other.

To suppress aberrations, it is desirable that the convex surfaces of the positive lens 21 and of the meniscus lens 25, which act as refractive surfaces, be formed as aspherical surfaces. A lens with an aspherical surface can be formed out of glass or resin, and forming it out of resin is easier. However, considering that a cholesteric liquid crystal layer reflects or transmits light selectively by exploiting the difference of the polarization direction of the light, it is essential to prevent the image light arriving at the cholesteric liquid crystal layer 36 from containing a light component that is polarized otherwise than desired, and therefore it is not desirable to form the concave surface side portion of the meniscus lens 25, which ultimately directs the image light to the cholesteric liquid crystal layer 36, out of resin, which exhibits birefringence. Thus, when the convex surface of the meniscus lens 25 is formed as an aspherical surface, it is preferable to form the entire meniscus lens 25 out of glass, or form the concave surface side portion thereof out of glass and the convex surface side portion thereof out of resin.

A meniscus lens of which the concave surface side portion is made of glass and of which the convex surface side portion is made of resin can be produced easily by first forming a meniscus lens having a spherical convex surface out of glass, then forming a resin layer on its convex surface side, and then forming the surface of the resin layer into an aspherical shape. Alternatively, one can be produced also by cementing together a concave lens made of glass and an aspherical convex lens made of resin.

Figure 2:
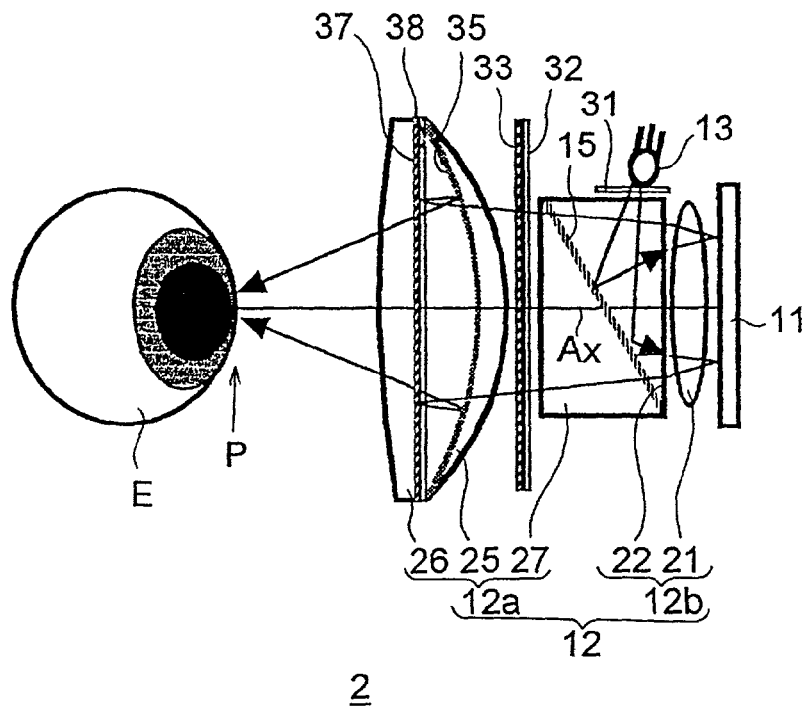
FIG. 2 is a diagram schematically showing the overall construction of the image display apparatus of a second embodiment of the invention.

FIG. 2 schematically shows the overall construction of the image display apparatus 2 of a second embodiment of the invention. The image display apparatus 2 is obtained by modifying part of the constituent components of the image display apparatus 1 and adding some components thereto. In the following descriptions, such components as are identical with or similar to those used in the image display apparatus 1 are identified with the same reference numerals, and overlapping explanations will not be repeated.

The rear and front portions 12b and 12a of the eyepiece optical system 12 include prisms 22 and 27, respectively. The prisms 22 and 27 hold a combiner 15 by sandwiching it from both sides. If the liquid crystal panel 11 side surface of the prism 22 and the observation point P side surface of the prism 27 are formed as flat surfaces that are parallel to each other, the prisms 22 and 27 have no power; if these surfaces are formed as curved surfaces, the prisms 22 and 27 have a power of their own. In particular, if the liquid crystal panel 11 side surface of the prism 22 is formed as a convex surface so as to function as the positive lens 21, there is no need any longer to provide a lens separately in the rear portion 12b.

In the image display apparatus 2, instead of a half mirror 14, a reflective polarizing plate is used as the combiner 15. Moreover, on the flat surface of the planoconvex lens 26 included in the front portion 12a of the eyepiece optical system 12, instead of a cholesteric liquid crystal layer 36, a reflective polarizing plate 37 is provided. Moreover, between the meniscus lens 25 and the planoconvex lens 26, a quarter-wave plate 38 is provided.

The illumination light, which is unpolarized, from the light source 13 is formed into linearly polarized light by the polarizing plate 31, then passes through the prism 22, and then strikes the reflective polarizing plate 15, i.e. the combiner. The polarizing plate 15 is so configured as to reflect light that is linearly polarized in the way that the light that has been transmitted through the polarizing plate 31 is, and thus reflects all the illumination light that strikes it. The illumination light reflected by the polarizing plate 15 passes through the prism 22, then passes through the positive lens 21, and then strikes the entire display surface of the liquid crystal panel 11 uniformly.

The liquid crystal panel 11 is controlled in such a way that the part of the linearly polarized light of which the polarization plane has been rotated by modulation is used as image light. The image light from the liquid crystal panel 11 travels along the same optical path as the illumination light in the opposite direction, then passes through the positive lens 21 and the prism 22 again, and then strikes the polarizing plate 15. The image light has its polarization plane rotated by 90°, and is therefore transmitted through the polarizing plate 15. On the other hand, the part of the linearly polarized light of which the polarization plane has not been rotated by modulation is reflected by the polarizing plate 15 and is thereby eliminated.

The image light transmitted through the polarizing plate 15 then passes through the prism 27, and then strikes the polarizing plate 32. The polarizing plate 32 is so configured as to transmit light that is linearly polarized in the way that the image light is, and thus transmits the image light. The polarizing plate 32 may be omitted; however, in a case where the elimination of unnecessary polarized light components by the polarizing plate 15 is incomplete, it serves to eliminate the remnants of such light components and thereby sharpen the presented image.

The image light transmitted through the polarizing plate 32 then passes through the quarter-wave plate 33 and is thereby formed into either right-hand or left-hand circularly polarized light. The image light thus formed into circularly polarized light enters the meniscus lens 25 through its convex surface, and a half of the image light is transmitted through the semitransparent reflective film 35 provided on the concave surface of the meniscus lens 25. The image light transmitted through the semitransparent reflective film 35 is then transmitted through the quarter-wave plate 38 and is thereby formed into a linearly polarized light, and then strikes the reflective polarizing plate 37. The reflective polarizing plate 37 is so configured as to reflect light that is linearly polarized in the way that this linearly polarized light is, and thus reflects the image light.

The image light reflected from the polarizing plate 37 is then transmitted through the quarter-wave plate 38 again and is thereby formed into circularly polarized light, and then strikes the semitransparent reflective film 35, by which a half of the image light is reflected. The image light, by being reflected from the semitransparent reflective film 35, is formed into light circularly polarized in the opposite rotation direction, is then transmitted through the quarter-wave plate 38 again, by which the image light is formed into a linearly polarized light. This linearly polarized light has its polarization plane rotated by 90°, and is therefore transmitted through the reflective polarizing plate 37. The image light transmitted through the reflective polarizing plate 37 then passes through the planoconvex lens 26, and then reaches the observation point P.

In the image display apparatus 2, as in the image display apparatus 1, the exit pupil of the eyepiece optical system 12 is located behind the liquid crystal panel 11, the relations defined by expressions (1) and (2) are fulfilled, and the angle between a normal to the reflective polarizing plate 15, i.e. the combiner, and the optical axis Ax of the eyepiece optical system 12 is in the range from 30° to 40°.

The image display apparatus 2, which uses a reflective polarizing plate 15 as the combiner, offers higher light use efficiency and thus presents brighter images than the image display apparatus 1, which uses a half mirror 14. In general, with a reflective polarizing plate, the larger the angle of incidence, the lower its transmittance toward light. However, in the image display apparatus 2, where the inclination of the polarizing plate 15 relative to the optical axis Ax of the eyepiece optical system 12 is as small as in the range from 30° to 40°, the image light can be transmitted without a loss.

In the image display apparatus 2, the prisms 22 and 27 are provided in the vacant portion of the space that a combiner 15 would occupy. Thus, the substantial optical path length through this space equals the thicknesses of the prisms 22 and 27 (i.e. their lengths along the optical axis Ax) divided by their respective refractive indices, i.e. shorter than when a combiner 15 is used. This makes it possible to place the rear and front portions 12b and 12a of the eyepiece optical system 12 still nearer to each other than in the image display apparatus 1. As a result, it is possible to make the eyepiece optical system 12 smaller and its focal length shorter, and thereby widen the field of view of the presented image.

In the image display apparatus 2 also, the polarizing plate 37 reflects or transmits light by exploiting the difference in the polarization direction of the light, and therefore, when the convex surface of the meniscus lens 25 is formed as an aspherical surface, it is preferable to form the entire meniscus lens 25 out of glass, or form the concave surface side portion thereof out of glass and the convex surface side portion thereof out of resin.

In the image display apparatus 2, the front portion 12a of the eyepiece optical system 12 is described as having a different construction than in the image display apparatus 1; however, it may have the same construction as in the image display apparatus 1. The prisms 22 and 27 may be omitted.

Hereinafter, practical examples of image display apparatus embodying the present invention will be presented on the basis of the construction of the second embodiment. In all of the practical examples described below, to eliminate unnecessary polarized light components and thereby make the presented image still sharper, a polarizing plate 39 is provided between the planoconvex lens 26 and the reflective polarizing plate 37.

PRACTICAL EXAMPLE 1

Figure 3:
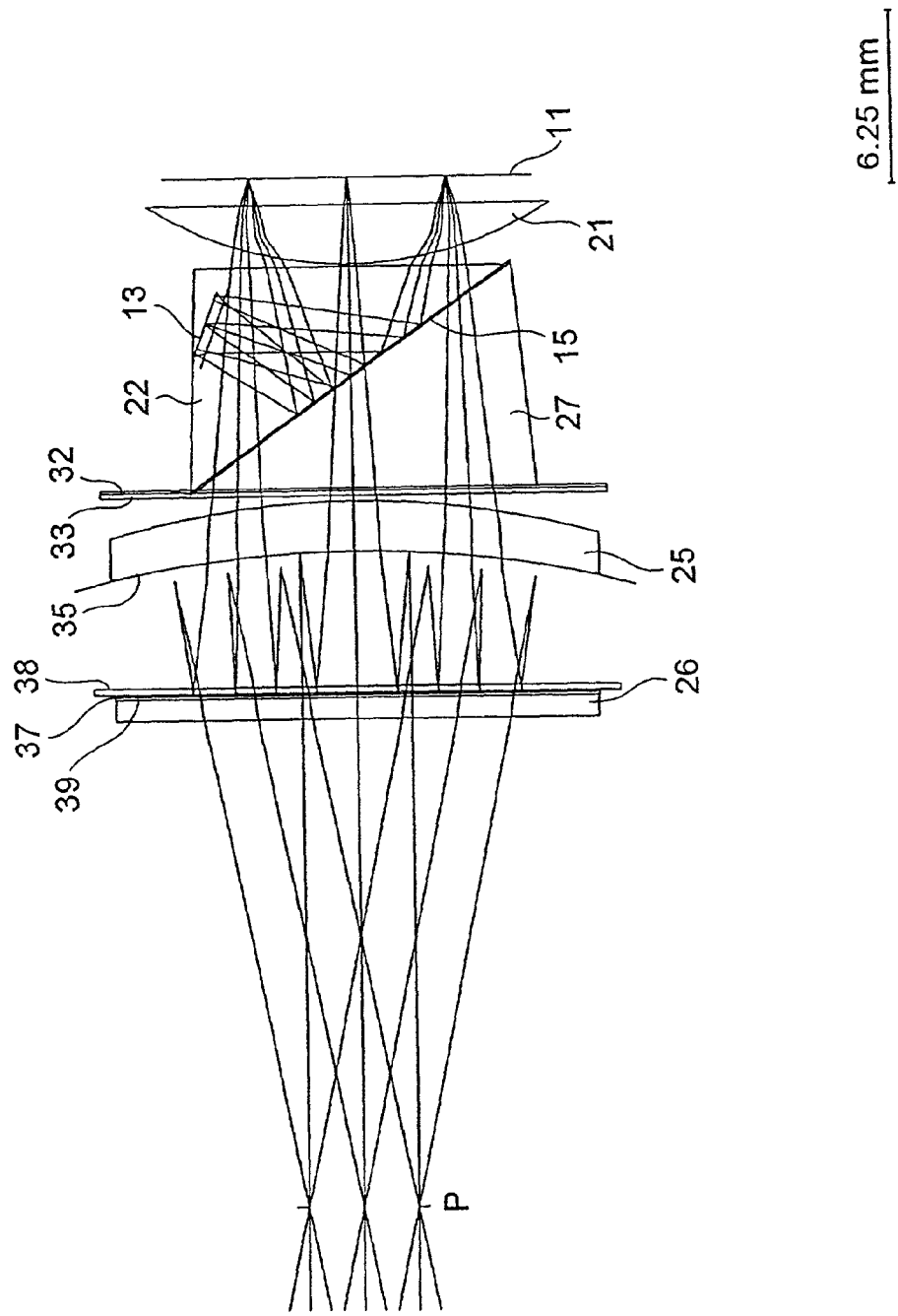
FIG. 3 is a diagram showing the construction and optical path of a first practical example.
Figure 4:
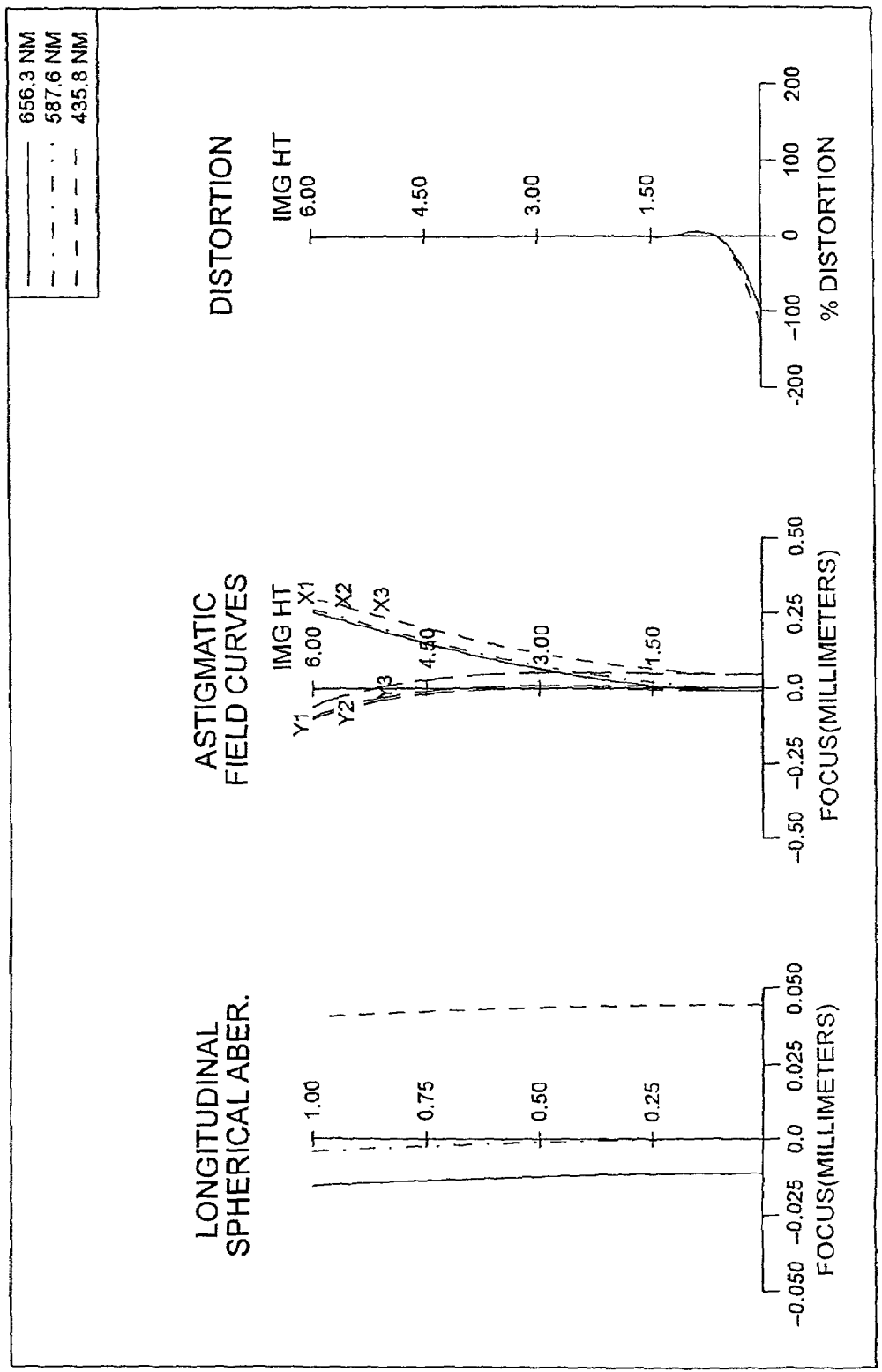
FIG. 4 is a diagram showing the spherical aberration, astigmatism, and distortion observed in the first practical example.
Figure 5:
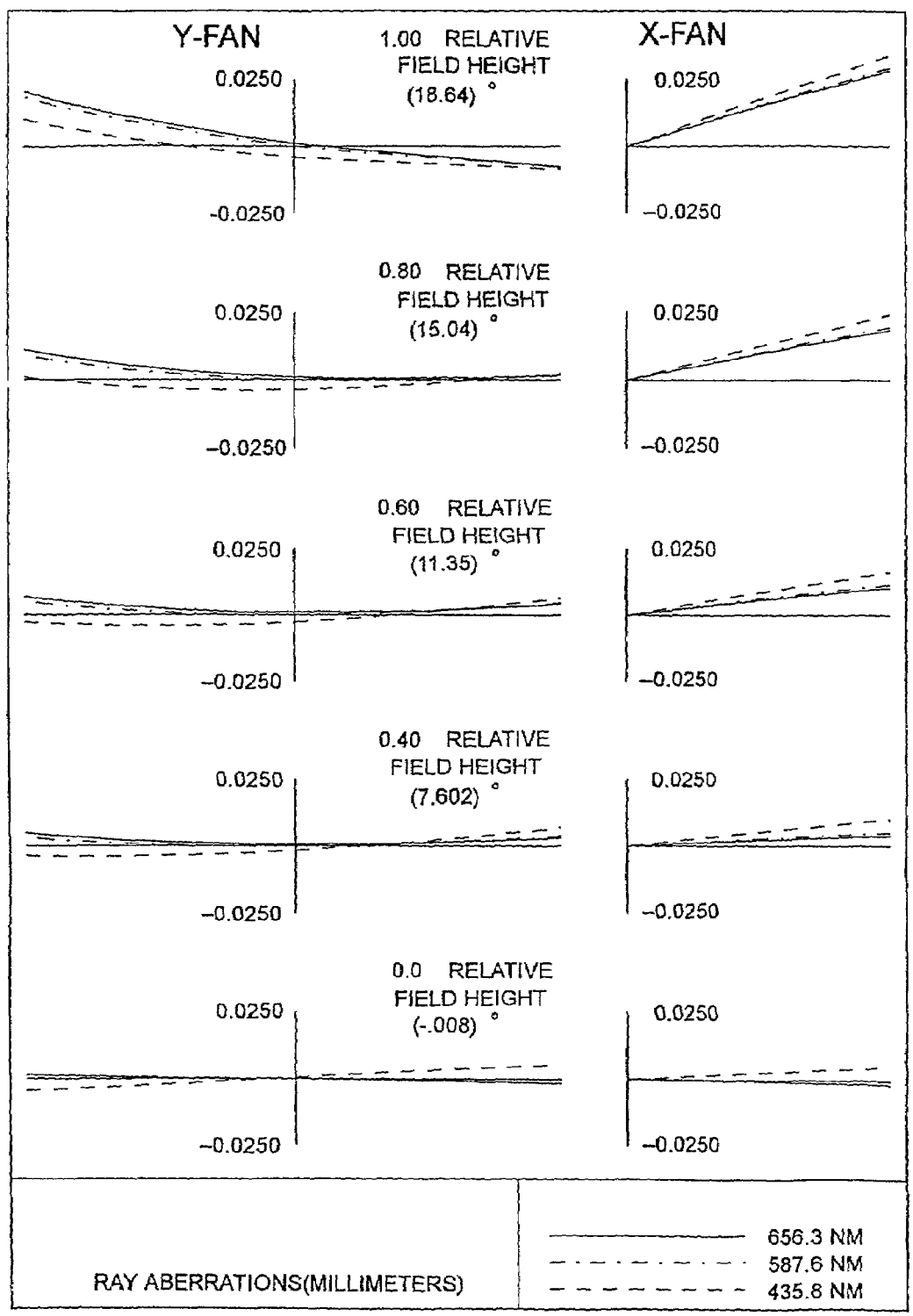
FIG. 5 is a diagram showing the curvature of field observed in the first practical example.

FIG. 3 shows the construction and optical path of a first practical example, and Table 1 shows the construction data thereof FIGS. 4 and 5 show the aberrations observed in this practical example. In the construction data, the surfaces are numbered in the order reverse to the direction in which the image light travels along its optical path. The refractive indices given are for light having a wavelength of 587.6 nm. These apply also to Tables 2 to 5 described later.

In this practical example, the focal length of the eyepiece optical system 12 as a whole is ft=18.000 mm, the focal length of the front portion 12a of the eyepiece optical system is fa=19.752 mm, the focal length of the rear portion 12b of the eyepiece optical system is fb=27.948 mm, and the distance from the rear end of the eyepiece optical system to the exit pupil is Epd=19.296 mm. Hence, fa/ft=1.097, and Epd/fb=0.690. The angle between the optical axis of the eyepiece optical system and a normal to the reflective polarizing plate 15 functioning as a combiner is θ=35°. The positive lens 21 constituting the rear portion 12b of the eyepiece optical system 12 is a planoconvex lens.

PRACTICAL EXAMPLE 2

Figure 6:
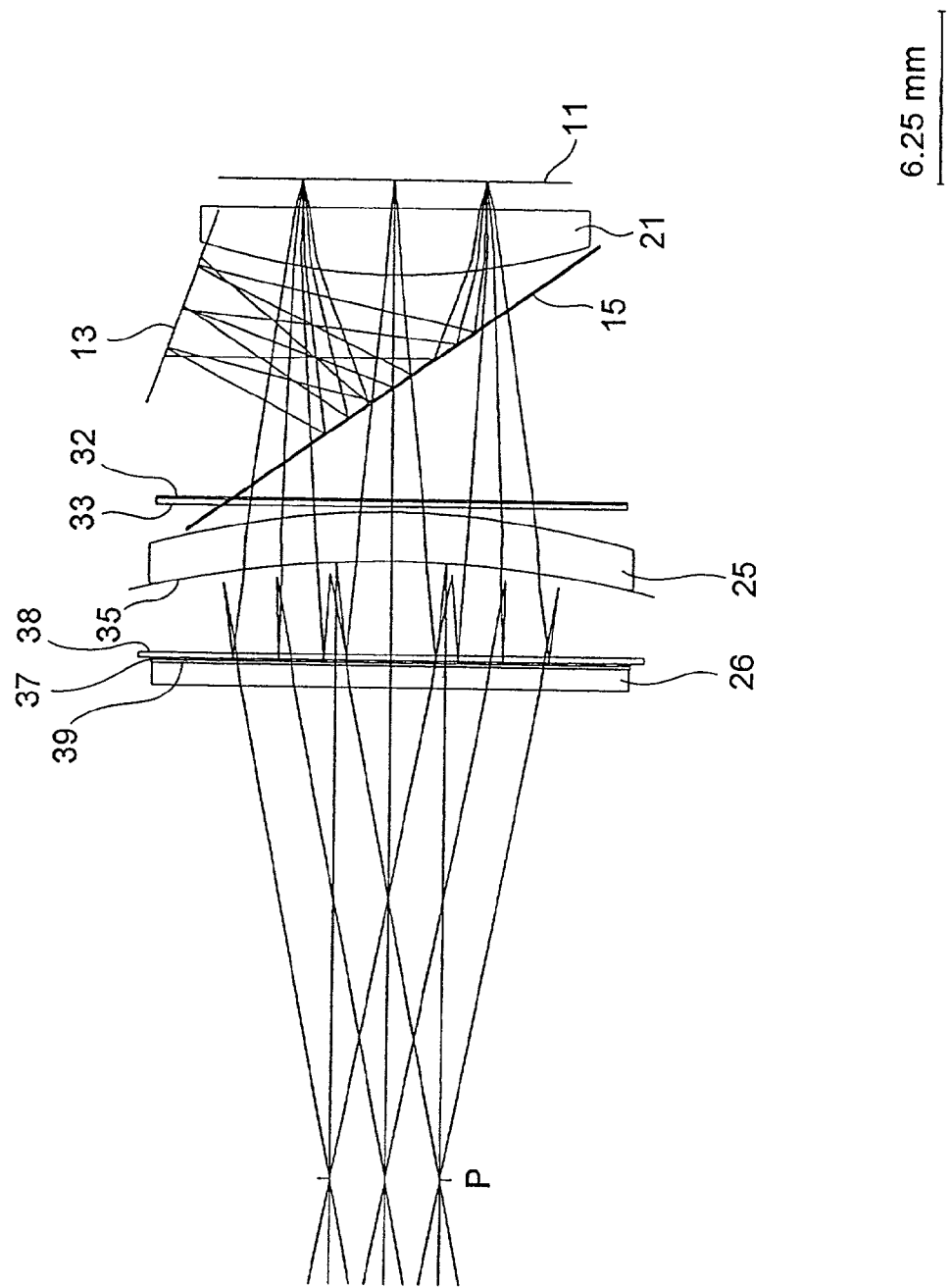
FIG. 6 is a diagram showing the construction and optical path of a second practical example.
Figure 7:
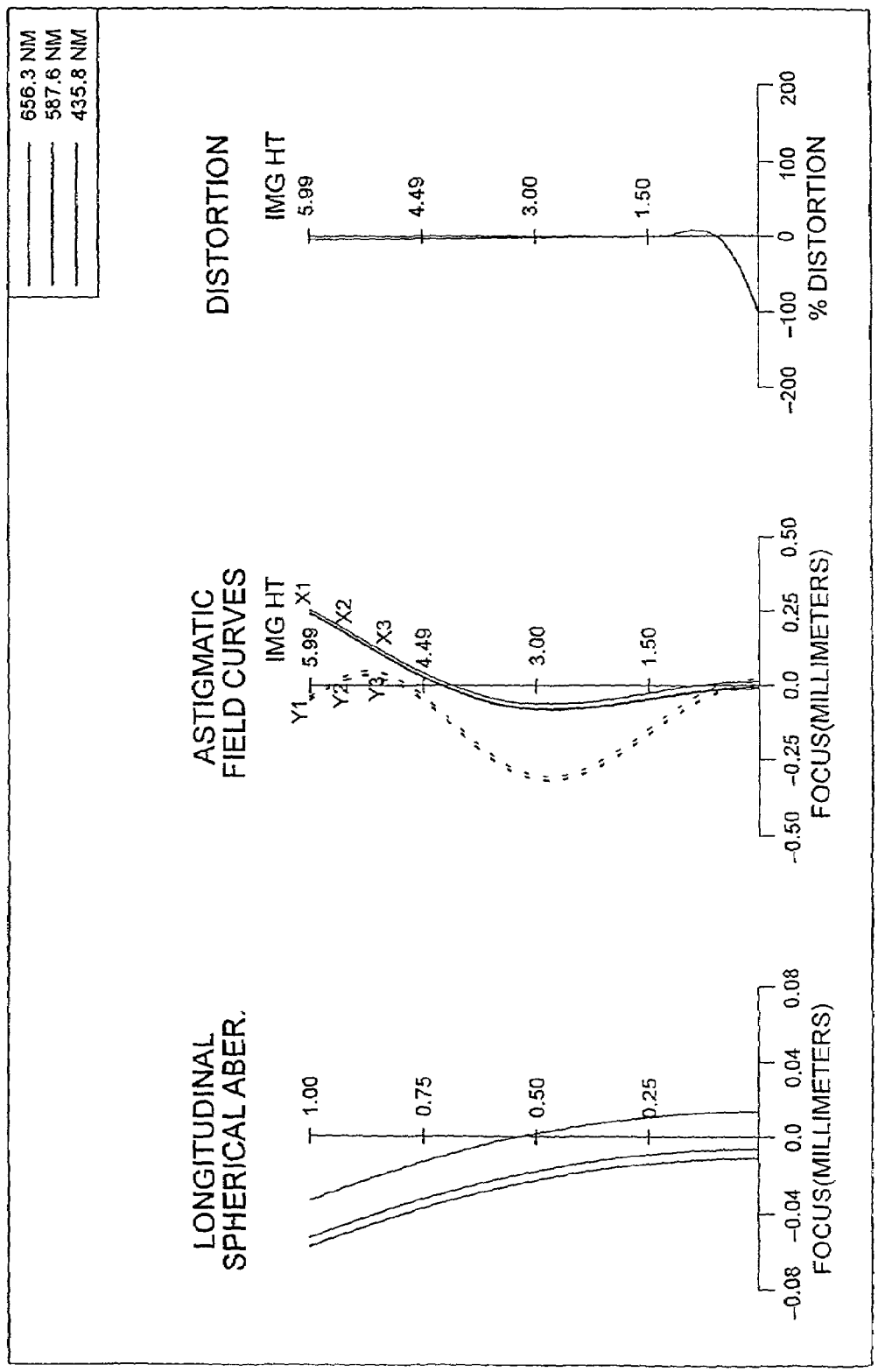
FIG. 7 is a diagram showing the spherical aberration, astigmatism, and distortion observed in the second practical example.
Figure 8:
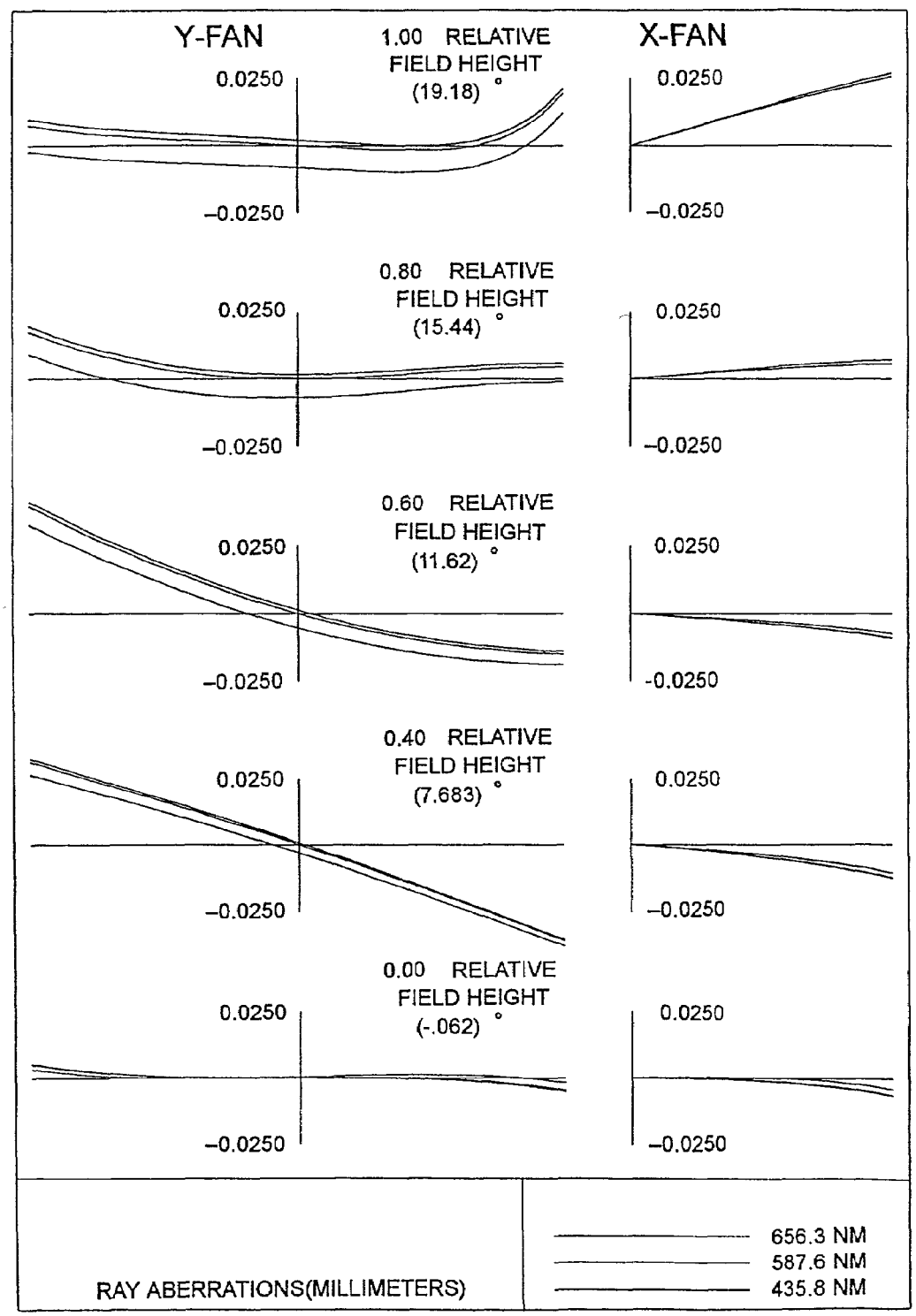
FIG. 8 is a diagram showing the curvature of field observed in the second practical example.

FIG. 6 shows the construction and optical path of a second practical example, and Table 2 shows the construction data thereof FIGS. 7 and 8 show the aberrations observed in this practical example.

In this practical example, ft=18.000 mm, fa=19.234 mm, fb=38.912 mm, Epd=26.809 mm, fa/ft=1.069, Epd/fb=0.689, and θ=35°. The prisms 22 and 27 are omitted.

The meniscus lens 25 has its convex surface (surface 11) formed as an aspherical surface, which is defined by expression (3) below.

$$Z=C \cdot h^2/\{1+[1-(1+K)\cdot C^2 \cdot h^2]^{1/2}\}+A4 \cdot h^4+A6 \cdot h^6+A8 \cdot h^8+A10 \cdot h^{10} \qquad (3)$$

where Z represents the displacement along the optical axis Ax, C represents the curvature (the reciprocal of the radius of curvature), h represents the distance from the optical axis, K represents a conic constant, and A4 to A10 represent the coefficients for the terms of orders 4 to 10.

The aspherical surface of the meniscus lens 25 has the following coefficients: K=0, A4=−0.962037×10⁻⁴, A6=0.275900×10⁻⁵, A8=−0.324928×10⁻⁷, A10=0.142936×10⁻⁹.

PRACTICAL EXAMPLE 3

Figure 9:
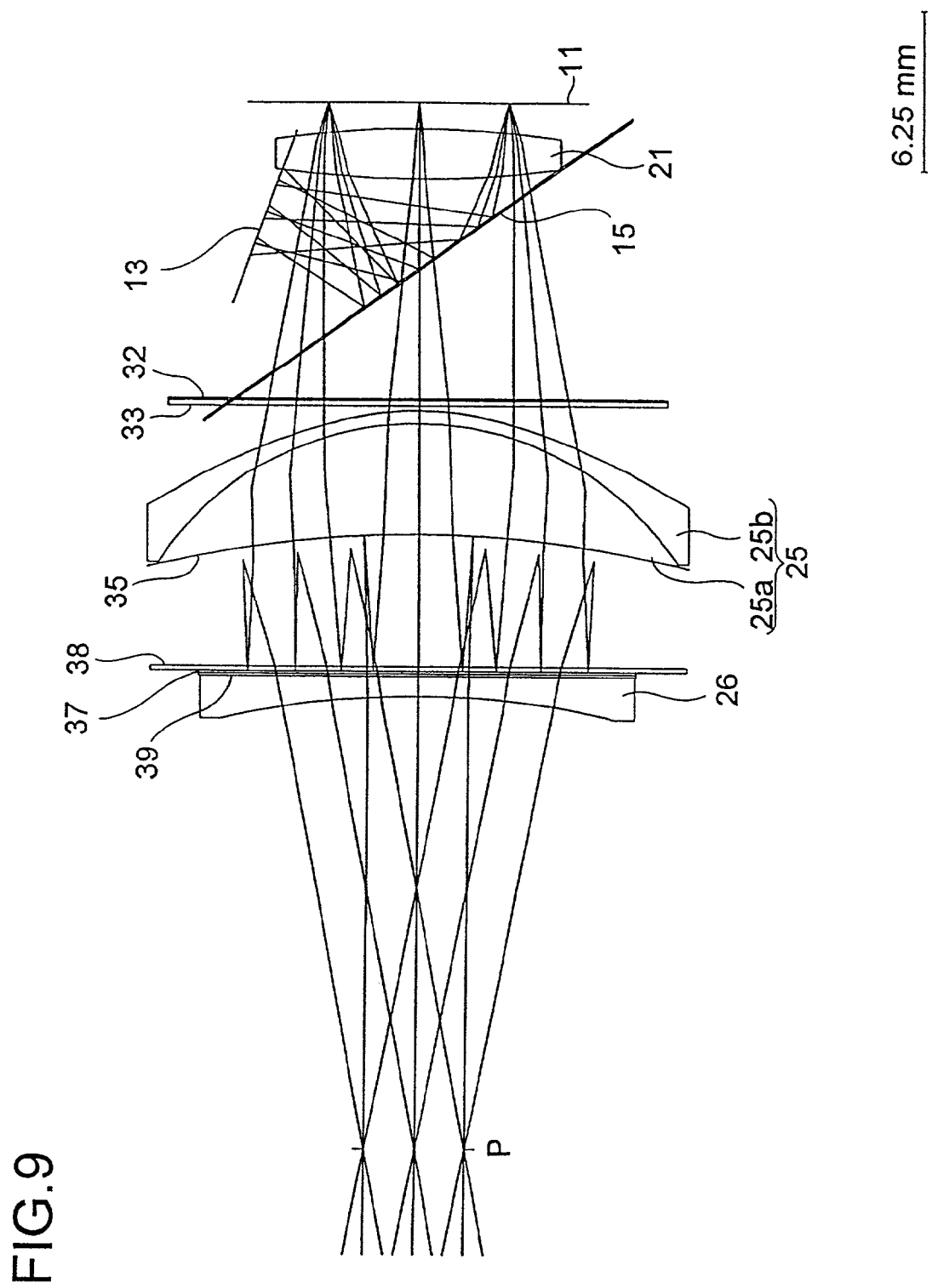
FIG. 9 is a diagram showing the construction and optical path of a third practical example.
Figure 10:
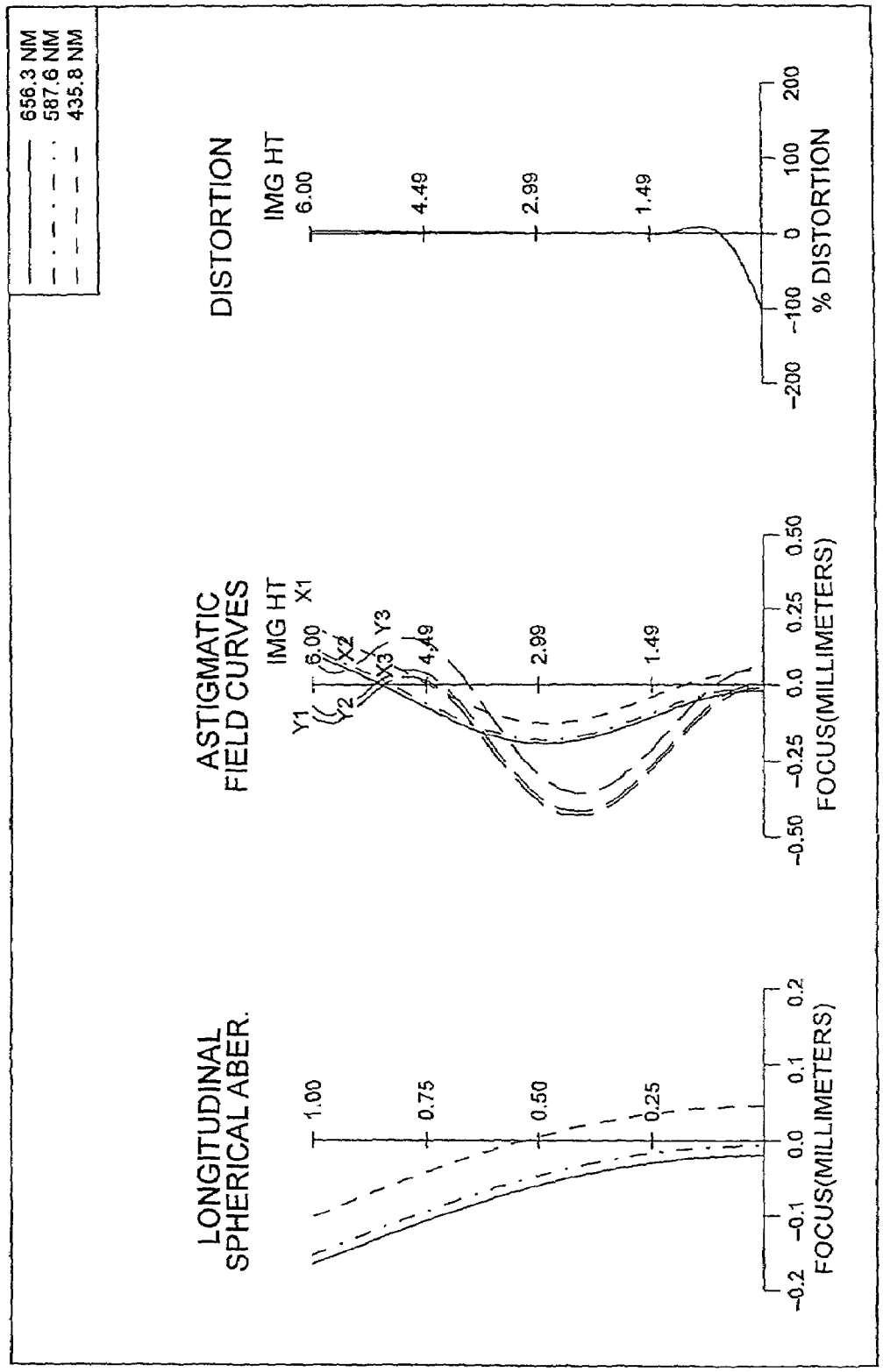
FIG. 10 is a diagram showing the spherical aberration, astigmatism, and distortion observed in the third practical example.
Figure 11:
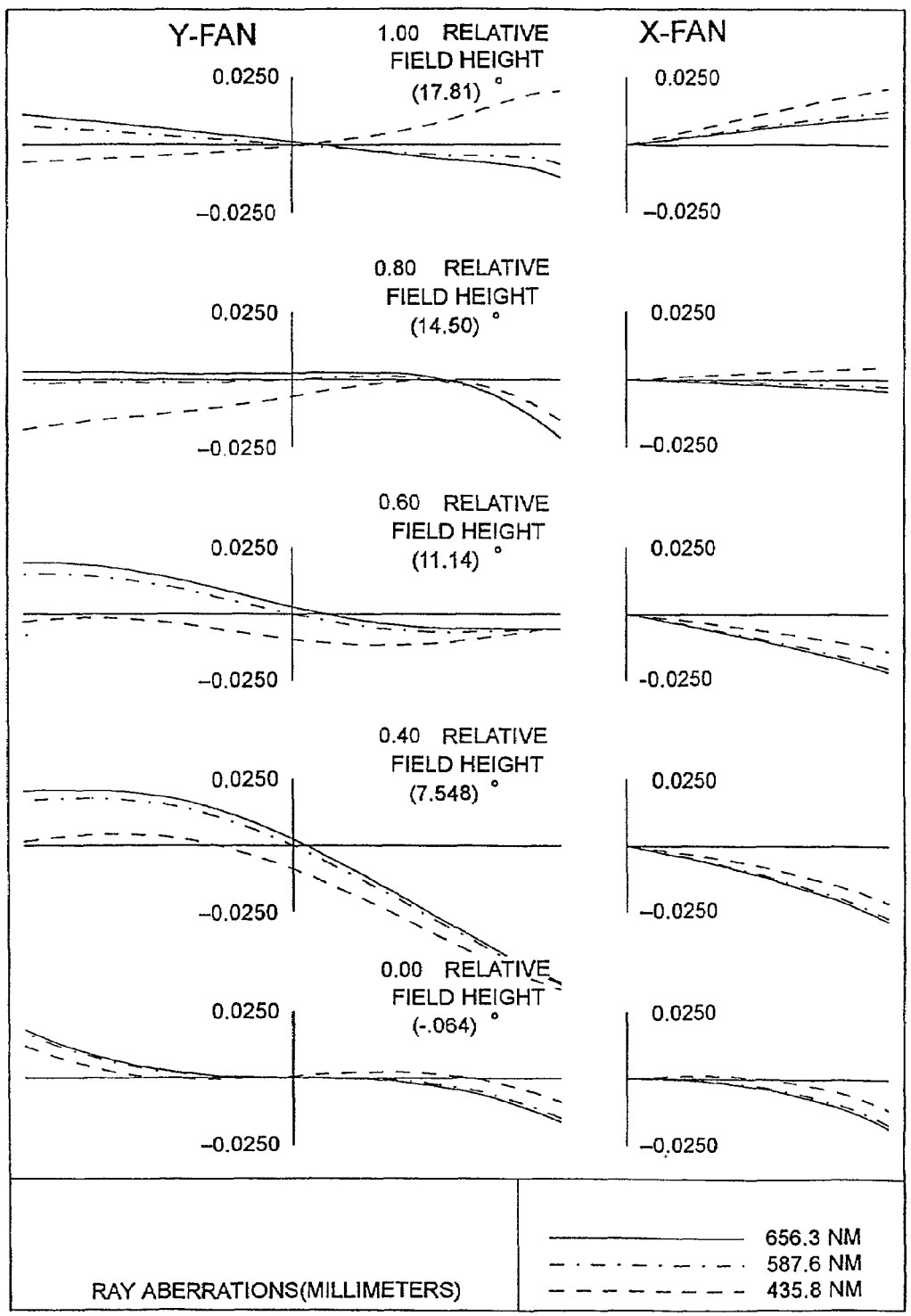
FIG. 11 is a diagram showing the curvature of field observed in the third practical example.

FIG. 9 shows the construction and optical path of a third practical example, and Table 3 shows the construction data thereof FIGS. 10 and 11 show the aberrations observed in this practical example.

In this practical example, ft=18.000 mm, fa=18.804 mm, fb=38.123 mm, Epd=14.818 mm, fa/ft=1.045, Epd/fb=0.389, and θ=35°. The prisms 22 and 27 are omitted.

The meniscus lens 25 is composed of a concave surface side portion 25a made of glass and a convex surface side portion 25b made of resin, and has its convex surface (surface 12) formed as an aspherical surface. This aspherical surface has the following coefficients: K=0, A4=0.147835×10⁻³, A6=0.811462×10⁻⁶, A8=−0.127597×10⁻⁷, A10=0.767565×10⁻¹⁰.

Moreover, the planoconvex lens 26 has its observation point P side surface (surface 1) formed as an aspherical surface. This aspherical surface has the following coefficients: K=0, A4=0.331917×10⁻⁴, A6=−0.159489×10⁻⁵, A8=0.188617×10⁻⁷, A10=−0.770228×10⁻¹⁰.

PRACTICAL EXAMPLE 4

Figure 12:
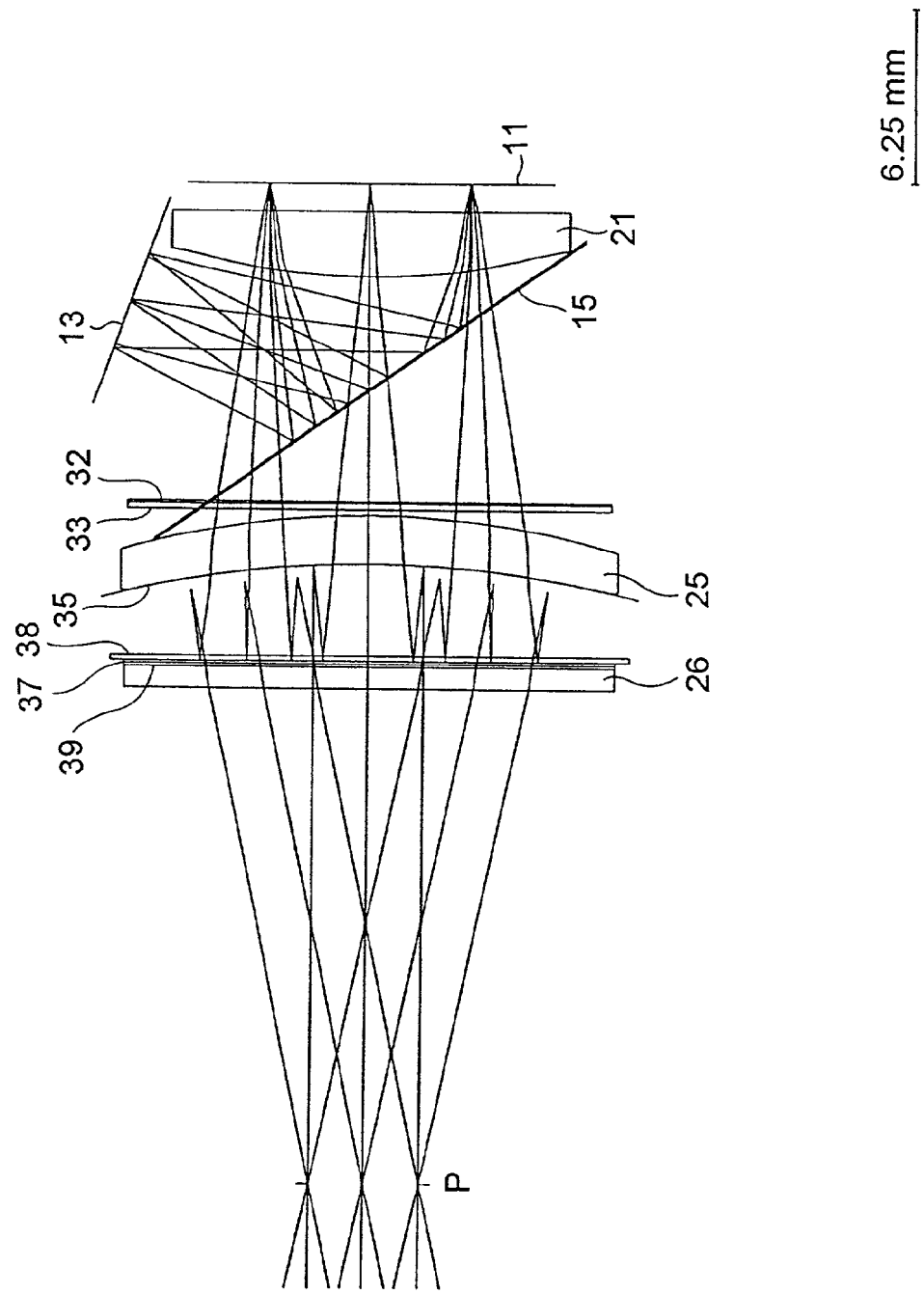
FIG. 12 is a diagram showing the construction and optical path of a fourth practical example.
Figure 13:
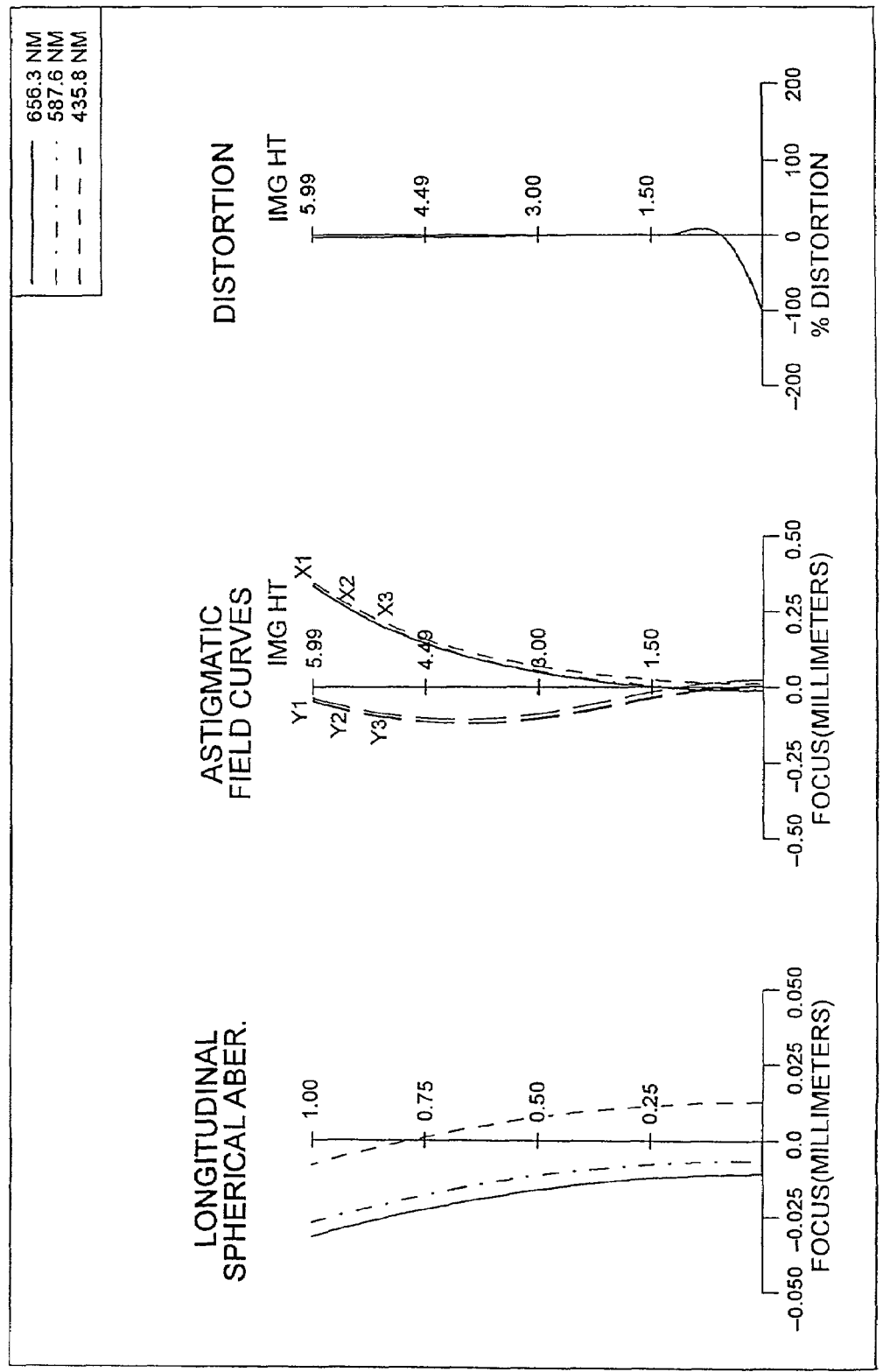
FIG. 13 is a diagram showing the spherical aberration, astigmatism, and distortion observed in the fourth practical example.
Figure 14:
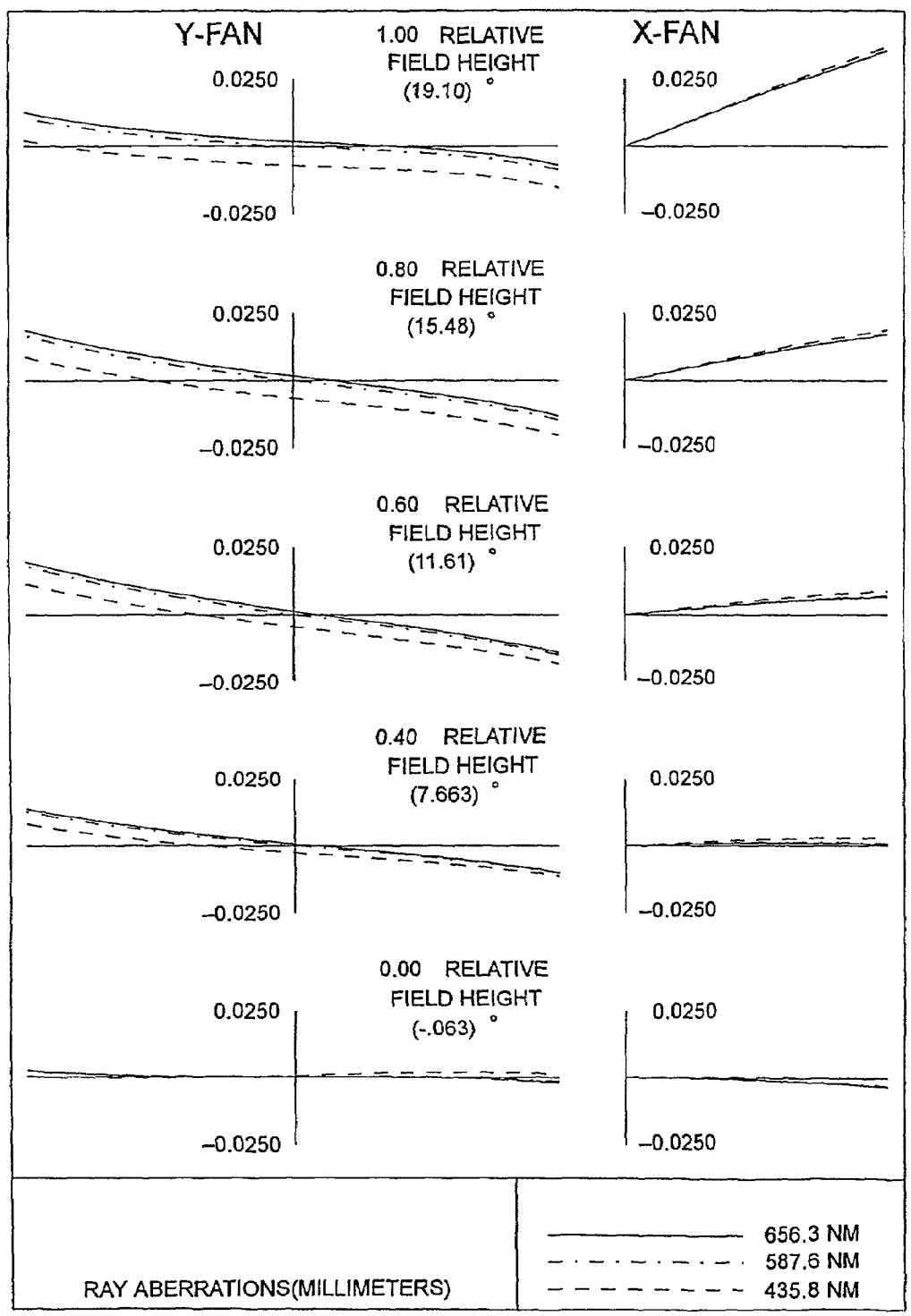
FIG. 14 is a diagram showing the curvature of field observed in the fourth practical example.

FIG. 12 shows the construction and optical path of a fourth practical example, and Table 4 shows the construction data thereof FIGS. 13 and 14 show the aberrations observed in this practical example.

In this practical example, ft=18.000 mm, fa=18.926 mm, fb=51.060 mm, Epd= 31.461 mm, fa/ft=1.051, Epd/fb=0.616, and θ=35°. The prisms 22 and 27 are omitted.

The positive lens 21 has its polarizing plate 15 side surface (surface 17) formed as an aspherical surface. This aspherical surface has the following coefficients: K=0, A4=0.301331×10$^{-3}$, A6=−0.487364×10$^{-5}$, A8=0, A10=0.

PRACTICAL EXAMPLE 5

Figure 15:
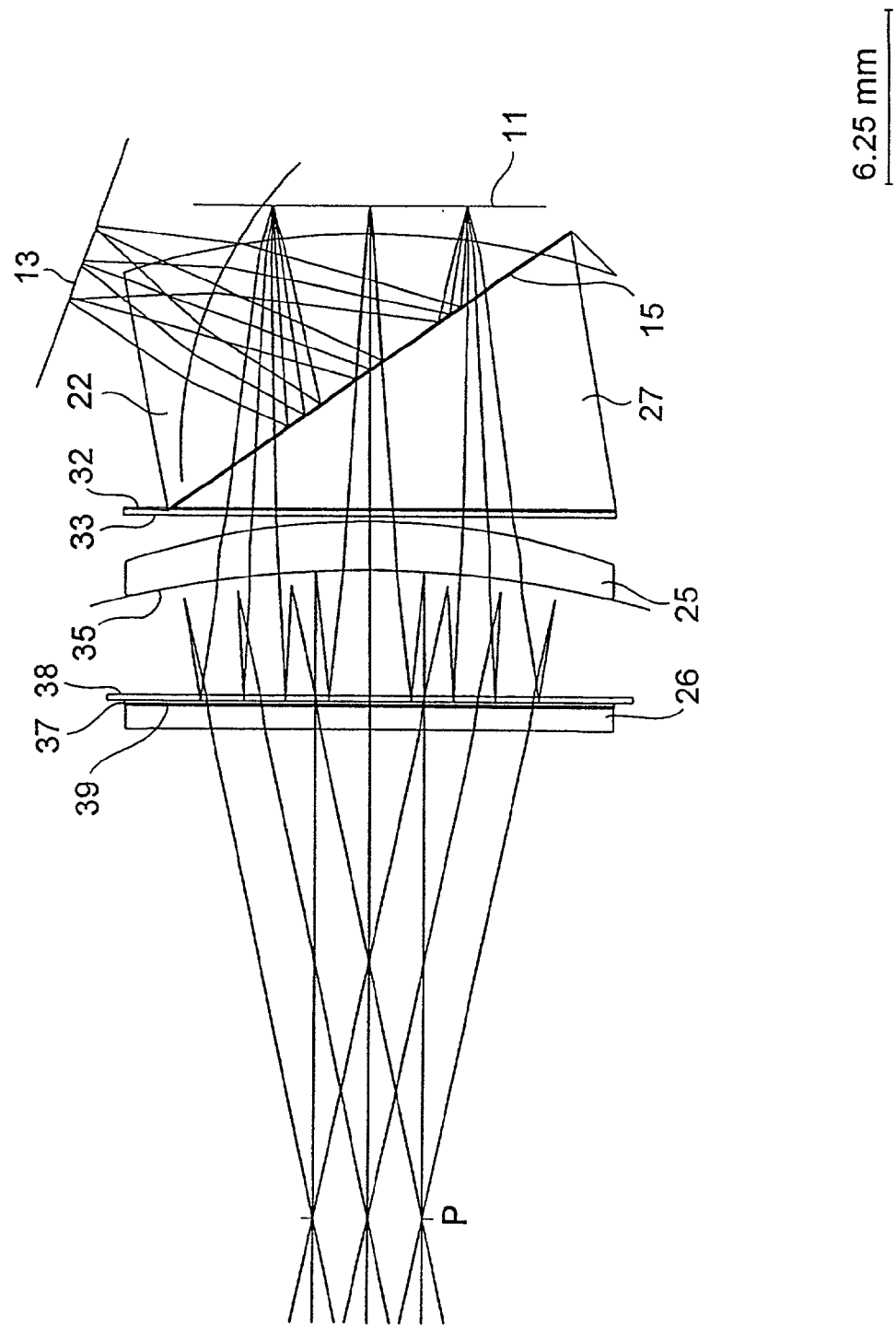
FIG. 15 is a diagram showing the construction and optical path of a fifth practical example.
Figure 16:
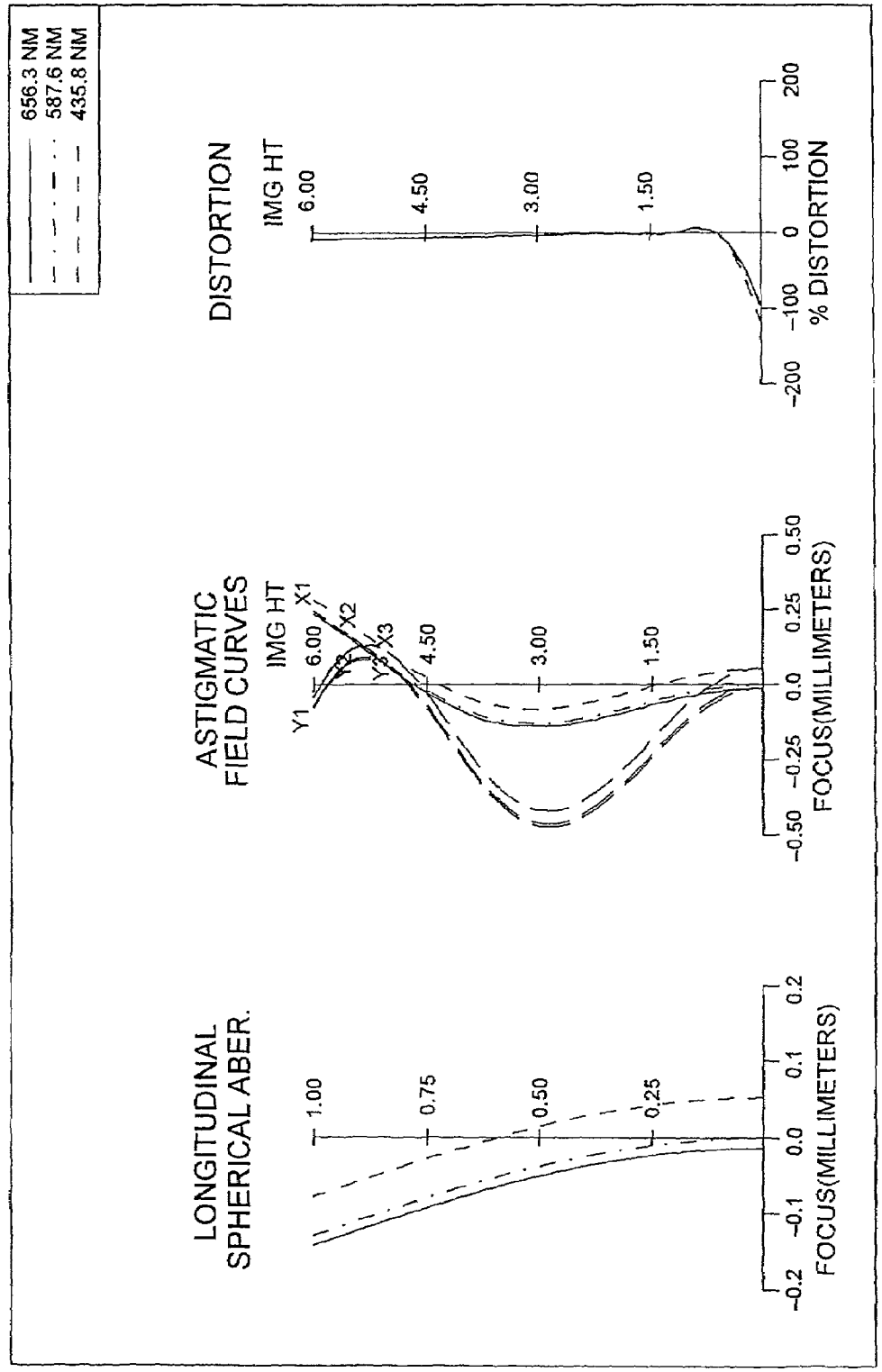
FIG. 16 is a diagram showing the spherical aberration, astigmatism, and distortion observed in the fifth practical example.
Figure 17:
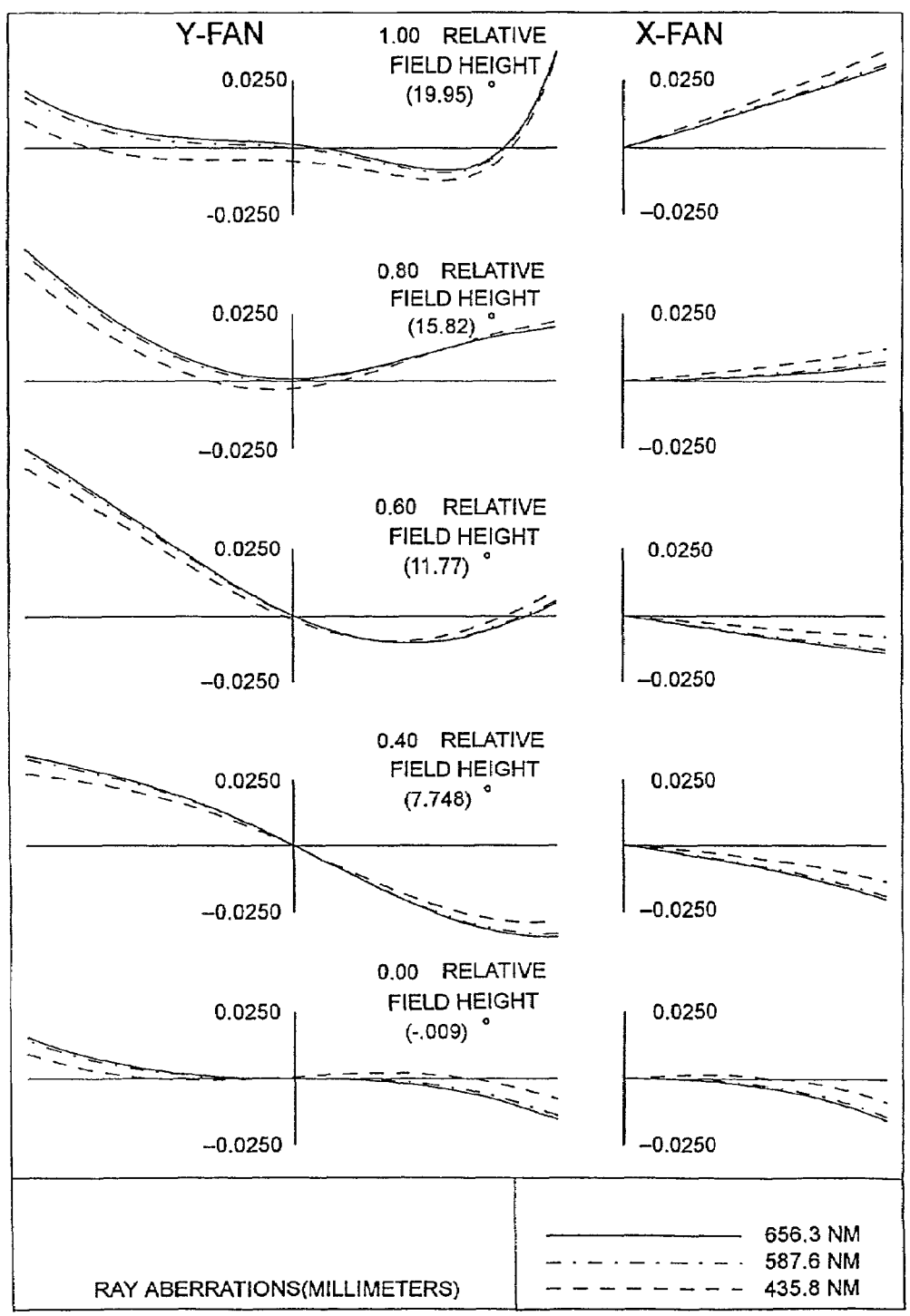
FIG. 17 is a diagram showing the curvature of field observed in the fifth practical example.
Figure 18:
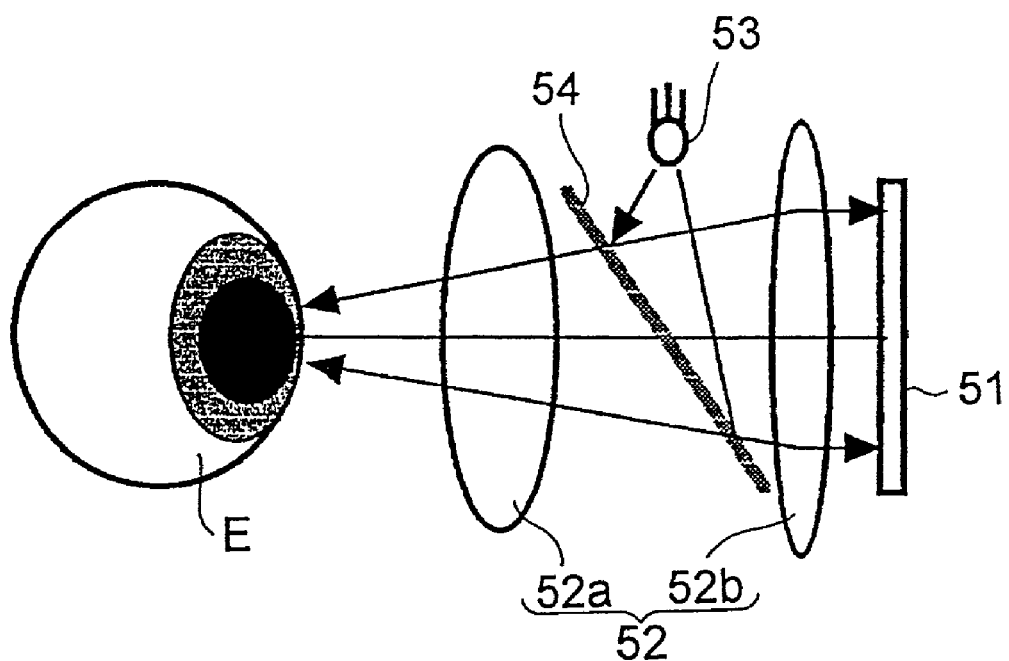
FIG. 18 is a diagram schematically showing the overall construction of a conventional image display apparatus.

FIG. 15 shows the construction and optical path of a fifth practical example, and Table 5 shows the construction data thereof FIGS. 16 and 17 show the aberrations observed in this practical example.

In this practical example, ft=18.000 mm, fa=18.341 mm, fb=53.696 mm, Epd=26.371 mm, fa/ft=1.019, Epd/fb=0.491, and θ=35°. The prism 22 has its liquid crystal panel 11 side surface formed as a convex surface, which is shared as the positive lens 21.

The planoconvex lens 26 has its observation point P side surface (surface 1) formed as an aspherical surface. This aspherical surface has the following coefficients: K=0, A4=0.605233×10$^{-4}$, A6=−0.215823×10$^{-5}$, A8=0.283409×10$^{-7}$, A10=−0.138355×10$^{-9}$.

Obviously, many modifications and variations of the present invention are possible in light of the above teachings. It is therefore to be understood that within the scope of the appended claims, the invention may be practiced other than as specifically described.

TABLE 1

| Surface | Reference Numeral | Radius of Curvature (mm) | Axial Distance (mm) | Refractive Index |
|---|---|---|---|---|
| 0 | P | ∞ | 18.000 | 1.0 |
|   | air |   |   |   |
| 1 | 26 | ∞ | 0.800 | 1.4914 |
| 2 | 39 | ∞ | 0.100 | 1.5834 |
| 3 | 37 | ∞ | 0.100 | 1.5834 |
| 4 | 38 | ∞ | 0.200 | 1.5834 |
| 5 | air | ∞ | 5.008 | 1.0 |
| 6 | 35 | −39.862 | −5.008 | (reflective) |
| 7 | 38 | ∞ | −0.200 | 1.5834 |
| 8 | 38 | ∞ | 0.200 | 1.5834 |
| 9 | air | ∞ | 5.008 | 1.0 |
| 10 | 25 | −39.862 | 1.800 | 1.5168 |
| 11 | air | −33.185 | 0.200 | 1.0 |
| 12 | 33 | ∞ | 0.200 | 1.5834 |
| 13 | 32 | ∞ | 0.100 | 1.5834 |
| 14 | 27 | ∞ | 4.000 | 1.5168 |
| 15 | 15 | ∞ | 0.100 | 1.5834 |
| 16 | 22 | ∞ | 4.000 | 1.5168 |
| 17 | air | ∞ | 0.100 | 1.0 |
| 18 | 21 | 13.611 | 2.200 | 1.4870 |
| 19 | air | ∞ | 1.000 | 1.0 |
| 20 | 11 | ∞ |   |   |

TABLE 2

| Surface | Reference Numeral | Radius of Curvature (mm) | Axial Distance (mm) | Refractive Index |
|---|---|---|---|---|
| 0 | P | ∞ | 18.000 | 1.0 |
|   | air |   |   |   |
| 1 | 26 | ∞ | 0.800 | 1.4914 |
| 2 | 39 | ∞ | 0.100 | 1.5834 |
| 3 | 37 | ∞ | 0.100 | 1.5834 |
| 4 | 38 | ∞ | 0.200 | 1.5834 |
| 5 | air | ∞ | 3.428 | 1.0 |
| 6 | 35 | −38.885 | −3.428 | (reflective) |
| 7 | 38 | ∞ | −0.200 | 1.5834 |
| 8 | 38 | ∞ | 0.200 | 1.5834 |
| 9 | air | ∞ | 3.428 | 1.0 |
| 10 | 25 | −38.885 | 1.800 | 1.5168 |
| 11 | air | −33.345 | 0.200 | 1.0 |
| 12 | 33 | ∞ | 0.200 | 1.5834 |
| 13 | 32 | ∞ | 0.100 | 1.5834 |
| 14 | air | ∞ | 4.000 | 1.0 |
| 15 | 15 | ∞ | 0.100 | 1.5834 |
| 16 | air | ∞ | 4.100 | 1.0 |
| 17 | 21 | 23.468 | 2.400 | 1.6031 |
| 18 | air | ∞ | 1.000 | 1.0 |
| 19 | 11 | ∞ |   |   |

TABLE 3

| Surface | Reference Numeral | Radius of Curvature (mm) | Axial Distance (mm) | Refractive Index |
|---|---|---|---|---|
| 0 | P | ∞ | 18.000 | 1.0 |
|   | air |   |   |   |
| 1 | 26 | −35.744 | 0.800 | 1.4914 |
| 2 | 39 | ∞ | 0.100 | 1.5834 |
| 3 | 37 | ∞ | 0.100 | 1.5834 |
| 4 | 38 | ∞ | 0.200 | 1.5834 |
| 5 | air | ∞ | 5.305 | 1.0 |
| 6 | 35 | −43.700 | −5.305 | (reflective) |
| 7 | 38 | ∞ | −0.200 | 1.5834 |
| 8 | 38 | ∞ | 0.200 | 1.5834 |
| 9 | air | ∞ | 5.305 | 1.0 |
| 10 | 25a | −43.700 | 4.459 | 1.5168 |
| 11 | 25b | −12.222 | 0.500 | 1.5179 |
| 12 | air | −12.222 | 0.200 | 1.0 |
| 13 | 33 | ∞ | 0.200 | 1.5834 |
| 14 | 32 | ∞ | 0.100 | 1.5834 |
| 15 | air | ∞ | 4.500 | 1.0 |
| 16 | 15 | ∞ | 0.100 | 1.5834 |
| 17 | air | ∞ | 4.000 | 1.0 |
| 18 | 21 | 40.141 | 2.400 | 1.5168 |
| 19 | air | −39.349 | 1.000 | 1.0 |
| 20 | 11 | ∞ |   |   |

TABLE 4

| Surface | Reference Numeral | Radius of Curvature (mm) | Axial Distance (mm) | Refractive Index |
|---|---|---|---|---|
| 0 | P | ∞ | 18.000 | 1.0 |
|   | air |   |   |   |
| 1 | 26 | ∞ | 0.800 | 1.4914 |
| 2 | 39 | ∞ | 0.100 | 1.5834 |
| 3 | 37 | ∞ | 0.100 | 1.5834 |
| 4 | 38 | ∞ | 0.200 | 1.5834 |
| 5 | air | ∞ | 3.328 | 1.0 |
| 6 | 35 | −38.586 | −3.328 | (reflective) |
| 7 | 38 | ∞ | 0.200 | 1.5834 |
| 8 | 38 | ∞ | 0.200 | 1.5834 |
| 9 | air | ∞ | 3.328 | 1.0 |
| 10 | 25 | −38.586 | 1.800 | 1.5168 |
| 11 | air | −31.783 | 0.200 | 1.0 |
| 12 | 33 | ∞ | 0.200 | 1.5834 |
| 13 | 32 | ∞ | 0.100 | 1.5834 |
| 14 | air | ∞ | 4.000 | 1.0 |

TABLE 4-continued

| Surface | Reference Numeral | Radius of Curvature (mm) | Axial Distance (mm) | Refractive Index |
|---|---|---|---|---|
| 15 | 15 | ∞ | 0.100 | 1.5834 |
| 16 | air | ∞ | 4.100 | 1.0 |
| 17 | 21 | 30.795 | 2.400 | 1.6031 |
| 18 | air | ∞ | 1.000 | 1.0 |
| 19 | 11 | ∞ | | |

TABLE 5

| Surface | Reference Numeral | Radius of Curvature (mm) | Axial Distance (mm) | Refractive Index |
|---|---|---|---|---|
| 0 | P | ∞ | | |
| air | 18.000 | | 1.0 | |
| 1 | 26 | ∞ | 0.800 | 1.4914 |
| 2 | 39 | ∞ | 0.100 | 1.5834 |
| 3 | 37 | ∞ | 0.100 | 1.5834 |
| 4 | 38 | ∞ | 0.200 | 1.5834 |
| 5 | air | ∞ | 4.680 | 1.0 |
| 6 | 35 | −37.734 | −4.680 | (reflective) |
| 7 | 38 | ∞ | −0.200 | 1.5834 |
| 8 | 38 | ∞ | 0.200 | 1.5834 |
| 9 | air | ∞ | 4.680 | 1.0 |
| 10 | 25 | −37.734 | 1.800 | 1.5168 |
| 11 | air | −26.702 | 0.200 | 1.0 |
| 12 | 33 | ∞ | 0.200 | 1.5834 |
| 13 | 32 | ∞ | 0.100 | 1.5834 |
| 14 | 27 | ∞ | 5.000 | 1.5168 |
| 15 | 15 | ∞ | 0.100 | 1.5834 |
| 16 | 22 | ∞ | 5.000 | 1.5168 |
| 17 | air | −27.750 | 1.000 | 1.0 |
| 18 | 11 | ∞ | | |

What is claimed is:

1. An image display apparatus comprising:
a display device of a reflective type for displaying an image and reflecting illumination light fed thereto from ahead so as to produce image light representing the image;
an eyepiece optical system, disposed in front of the display device and composed of a rear portion nearer to the display device and a front portion farther from the display device, for directing the image light from the display device through the rear and front portions to a predetermined observation point so as to permit a virtual image of the image displayed by the display device to be observed at the observation point;
a light source, disposed in a position substantially conjugate with the observation point, for emitting the illumination light fed to the display device; and
a combiner, disposed between the rear and front portions of the eyepiece optical system, for introducing the illumination light from the light source into the rear portion of the eyepiece optical system in such a way that a path of the illumination light overlaps with a path of the image light,
wherein
the rear portion of the eyepiece optical system includes a refractive optical element having a positive power,
the front portion of the eyepiece optical system includes a concave reflective surface, and
the eyepiece optical system has an exit pupil behind and at a finite distance from the display device.

2. An image display apparatus as claimed in claim 1, wherein the following relations are fulfilled $$1 < fa/ft \leq 1.4$$

$$0.3 \leq Epd/fb \leq 0.9$$

where
ft represents a focal length of the eyepiece optical system as a whole;
fa represents a focal length of the front portion of the eyepiece optical system;
fb represents a focal length of the rear portion of the eyepiece optical system; and
Epd represents a distance from a rear end of the eyepiece optical system to the exit pupil of the eyepiece optical system.

3. An image display apparatus as claimed in claim 1, wherein the concave reflective surface included in the front portion of the eyepiece optical system is a semi-transparent reflective surface that partially reflects and partially transmits light, and is so disposed as to point to the observation point, and
the front portion of the eyepiece optical system includes a selective reflective surface that is so disposed as to face the concave reflective surface and that reflects or transmits light selectively according to a polarization direction of the light.

4. An image display apparatus as claimed in claim 3, wherein the concave reflective surface included in the front portion of the eyepiece optical system is formed as a concave surface of a meniscus lens, and
the selective reflective surface included in the front portion of the eyepiece optical system is formed on a flat surface of a member that has a flat surface and that transmits light.

5. An image display apparatus as claimed in claim 4, wherein a convex surface of the meniscus lens included in the front portion of the eyepiece optical system is formed as an aspherical surface.

6. An image display apparatus as claimed in claim 5, wherein the meniscus lens included in the front portion of the eyepiece optical system is composed of a concave surface side portion made of glass and a convex surface side portion made of resin.

7. An image display apparatus as claimed in claim 1, wherein the refractive optical element having a positive power included in the rear portion of the eyepiece optical system is a planoconvex lens.

8. An image display apparatus as claimed in claim 1, wherein the refractive optical element having a positive power included in the rear portion of the eyepiece optical system has an aspherical convex surface.

9. An image display apparatus as claimed in claim 1, wherein the display device is a reflective liquid crystal panel, and
the combiner is a reflective polarizing plate.

10. An image display apparatus as claimed in claim 1, wherein an optical axis of the rear portion of the eyepiece optical system coincides with an optical axis of the front portion thereof,
the combiner is planar, and
an angle between an optical axis of the eyepiece optical system and a normal to the combiner is in a range from 30° to 40°.

11. An image display apparatus as claimed in claim 1, wherein the rear and front portions of the eyepiece optical system each include a prism, and
the combiner is disposed between the prism included in the rear portion of the eyepiece optical system and the prism included in the front portion thereof.

12. An image display apparatus as claimed in claim 11, wherein the prism included in the rear portion of the eyepiece optical system has a convex surface so as to be shared as the refractive optical element having a positive power.

* * * * *

UNITED STATES PATENT AND TRADEMARK OFFICE
CERTIFICATE OF CORRECTION

PATENT NO. : 7,002,751 B2  Page 1 of 1
APPLICATION NO. : 09/963308
DATED : February 21, 2006
INVENTOR(S) : Yasushi Kobayashi and Soh Ohzawa It is certified that error appears in the above-identified patent and that said Letters Patent is hereby corrected as shown below:

Column 14,
Table 4, line 60, delete "7  38  ∞  0.200    1.5834" and insert
-- 7  38 ∞  -0.200  1.5834 --.

Column 15,
Table 5, lines 6-7, delete "air  18.000  1.0" and insert -- air  18.000  1.0  -1578.185 --.

Signed and Sealed this

Twenty-seventh Day of June, 2006

JON W. DUDAS
*Director of the United States Patent and Trademark Office*